United States Patent
Kyono

(10) Patent No.: US 7,120,036 B2
(45) Date of Patent: Oct. 10, 2006

(54) SWITCHING-MODE POWER SUPPLY HAVING A SYNCHRONOUS RECTIFIER

(75) Inventor: Yoichi Kyono, Niiza (JP)

(73) Assignee: Sanken Electric Co., Ltd., (JP)

( * ) Notice: Subject to any disclaimer, the term of this patent is extended or adjusted under 35 U.S.C. 154(b) by 0 days.

(21) Appl. No.: 11/392,441

(22) Filed: Mar. 28, 2006

(65) Prior Publication Data

US 2006/0171180 A1   Aug. 3, 2006

Related U.S. Application Data

(63) Continuation of application No. PCT/JP2004/014075, filed on Sep. 27, 2004.

(30) Foreign Application Priority Data

Sep. 30, 2003   (JP) .............................. 2003-340758

(51) Int. Cl.
*H02M 3/335*   (2006.01)

(52) U.S. Cl. ................. 363/21.06; 363/21.14; 363/89

(58) Field of Classification Search .......... 363/21.04, 363/21.05, 21.06, 21.12, 21.13, 21.14, 84, 363/89, 125, 127

See application file for complete search history.

(56) References Cited

U.S. PATENT DOCUMENTS

| | | | | |
|---|---|---|---|---|
| 5,719,755 A | 2/1998 | Usui | ........................... | 363/19 |
| 6,496,395 B1 * | 12/2002 | Tokunaga et al. | ............. | 363/97 |
| 6,618,274 B1 * | 9/2003 | Boylan et al. | ................ | 363/17 |
| 6,995,991 B1 * | 2/2006 | Yang et al. | ............... | 363/21.14 |
| 7,012,821 B1 * | 3/2006 | Park et al. | ................ | 363/21.12 |
| 2002/0021574 A1 | 2/2002 | Ishii et al. | ..................... | 363/20 |

FOREIGN PATENT DOCUMENTS

| | | |
|---|---|---|
| JP | 09-163736 A | 6/1997 |
| JP | 11-332226 A | 11/1999 |
| JP | 11-341799 A | 12/1999 |
| JP | 2000-023456 A | 1/2000 |
| JP | 2001-346379 A | 12/2001 |

* cited by examiner

*Primary Examiner*—Adolf Berhane
(74) *Attorney, Agent, or Firm*—Woodcock Washburn LLP

(57) ABSTRACT

A DC-to-DC converter incorporates a transformer having a primary winding connected to a pair of DC input terminals via an active switch, which turns on and off under the control of a feedback circuit, and a secondary winding connected to a pair of DC output terminals via a synchronous rectifier and a smoothing capacitor. The synchronous rectifier is a parallel connection of a synchronous rectifier switch and a diode. A synchronous rectifier control circuit is connected to the synchronous rectifier switch for causing conduction therethrough while the active switch is off. The synchronous rectifier control circuit comprises a capacitor for determination of the conducting periods of the synchronous rectifier switch, and a logic network for on/off control of the synchronous rectifier switch according to whether the active switch is on or off and whether the capacitor voltage is higher than a predefined threshold or not.

21 Claims, 16 Drawing Sheets

SWITCHING-MODE POWER SUPPLY HAVING A SYNCHRONOUS RECTIFIER

CROSS REFERNCE TO RELATED APPLICATIONS

This is a continuation of Application PCT/JP2004/014075, filed Sep. 27, 2004, which claims priority to Japanese Patent Application No. 2003-340758 filed Sep. 30, 2003.

BACKGROUND OF THE INVENTION

This invention relates to an electronic power supply unit known as the switching-mode power supply, incorporating a switching regulator whereby the load current is switched rapidly on and off for output voltage stabilization. More specifically, the invention pertains to such a power supply of the kind having a synchronous rectifier circuit.

A typical conventional switching-mode power supply with a flyback DC-to-DC converter includes a transformer having a primary winding coupled to the pair of DC input terminals via an active switch, and a secondary winding coupled to the pair of DC output terminals via a rectifying diode and smoothing capacitor. The DC input voltage is turned on and off as the active switch is driven by pulses that have been width-modulated by a feedback circuit monitoring the DC output voltage. Energy is stored on the transformer during the conducting periods of the active switch and released during its nonconducting periods. The smoothing capacitor is charged as the rectifying diode conducts during the nonconducting periods of the active switch.

A voltage drop of approximately 0.8 volt has been known to occur across the rectifying diode of the above switching-mode power supply. Japanese Unexamined Patent Publication No. 9-163736 teaches how to reduce this voltage drop, and consequent power loss, across the rectifying diode. Connected in parallel with the rectifying diode according to this prior art is a synchronous rectifier switch which is turned on during the conducting periods of the rectifying diode. The synchronous rectifier switch, particularly when in the form of a bipolar or field-effect transistor, introduces a voltage drop of as low as 0.2 volt or so, realizing an appreciable diminution of an overall voltage drop on the output side of the transformer.

This prior art technique has proved to possess its own shortcomings, however. One of them is the difficulty of turning on the synchronous rectifier switch in exact synchronism with the conducting periods of the rectifying diode. This difficulty becomes even more serious because the conducting periods of the rectifying diode are subject to change with the input voltage and with the voltage requirement of the load.

Another weakness has manifested itself in the event of an abrupt drop in the output voltage of the switching-mode power supply in response to the load. Thereupon the standard feedback circuit of the closed-loop switching regulator has responded by correspondingly extending the conduction time of the active switch. The possible result has been the overlapping of the conduction periods of the active switch and those of the synchronous rectifier switch. Such overlapping, if it occurred at all, led to noise production and, worse yet, to the destruction of the associated circuit parts.

The synchronous rectification technology and its yet-unremedied drawbacks discussed above are not peculiar to the flyback DC-to-DC converter. The same scheme is applicable, at the risk of the emergence of like difficulties, to many other varieties of switching-mode power supplies, some known examples being a boost converter, a forward converter, a chopper controller, and a combination of an inverter and a rectifier/filter circuit.

SUMMARY OF THE INVENTION

The present invention seeks to resolve the noted problems attendant to the synchronous rectifier switch in switching-mode power supplies of various known types and configurations.

Briefly, the invention may be summarized as a switching-mode power supply for DC-to-DC conversion, comprising a converter circuit connected between DC input means and DC output means. The converter circuit includes an active switch for switching the input DC voltage on and off under the direction of a switch control circuit. Connected between the converter circuit and the DC output means is a synchronous rectifier having a parallel connection of a diode and a switch. For on/off control of this synchronous rectifier switch there is provided a synchronous rectifier control circuit comprising: (a) conduction period detect means for providing a conduction period detect signal indicative of whether the active switch is conductive or not; (b) a capacitor for determination of the conducting periods of the synchronous rectifier switch; (c) a charge/discharge circuit connected to the converter circuit and the capacitor for causing the latter to be charged and discharged according to whether the active switch is conductive or nonconductive and hence for causing the capacitor to develop a voltage indicative of the conduction or nonconduction of the active switch; and (d) a logic network having an input connected to the conduction period detect means, another input connected to the capacitor, and an output connected to the synchronous rectifier switch, for making on/off control of the synchronous rectifier switch according to whether the active switch is conducting or nonconducting and whether the voltage across the capacitor is higher than a predefined voltage or threshold or not.

The term "synchronous rectification" as used herein and in the claims appended hereto refers to all sorts of rectifications of the converter output in certain phase relationships to the conduction and nonconduction of the active switch. The term "synchronous rectifier switch" likewise refers to a switch conducive to the rectification or smoothing of the converter output in certain phase relationships to the conduction and nonconduction of the active switch.

A most pronounced feature of the invention resides in the configuration of the synchronous rectifier control circuit for on/off control of the synchronous rectifier switch. Despite the simple design comprising a capacitor and a logic network, the synchronous rectifier control circuit accurately determines the conducting periods of the synchronous rectifier switch and make them as long as feasible within the limits of the nonconducting periods of the active switch. A higher efficiency is thus gained by the switching-mode power supply. Furthermore, as the active switch and synchronous rectifier switch are positively prevented from concurrent conduction, the power supply is saved from noise problems and the rupture of its constituent parts.

The above and other objects, features and advantages of this invention will become more apparent, and the invention itself will best be understood, from a study of the following description and appended claims, with reference had to the attached drawings showing some preferable embodiments of the invention.

DESCRIPTION OF THE PREFERRED EMBODIMENTS

Figure 1:
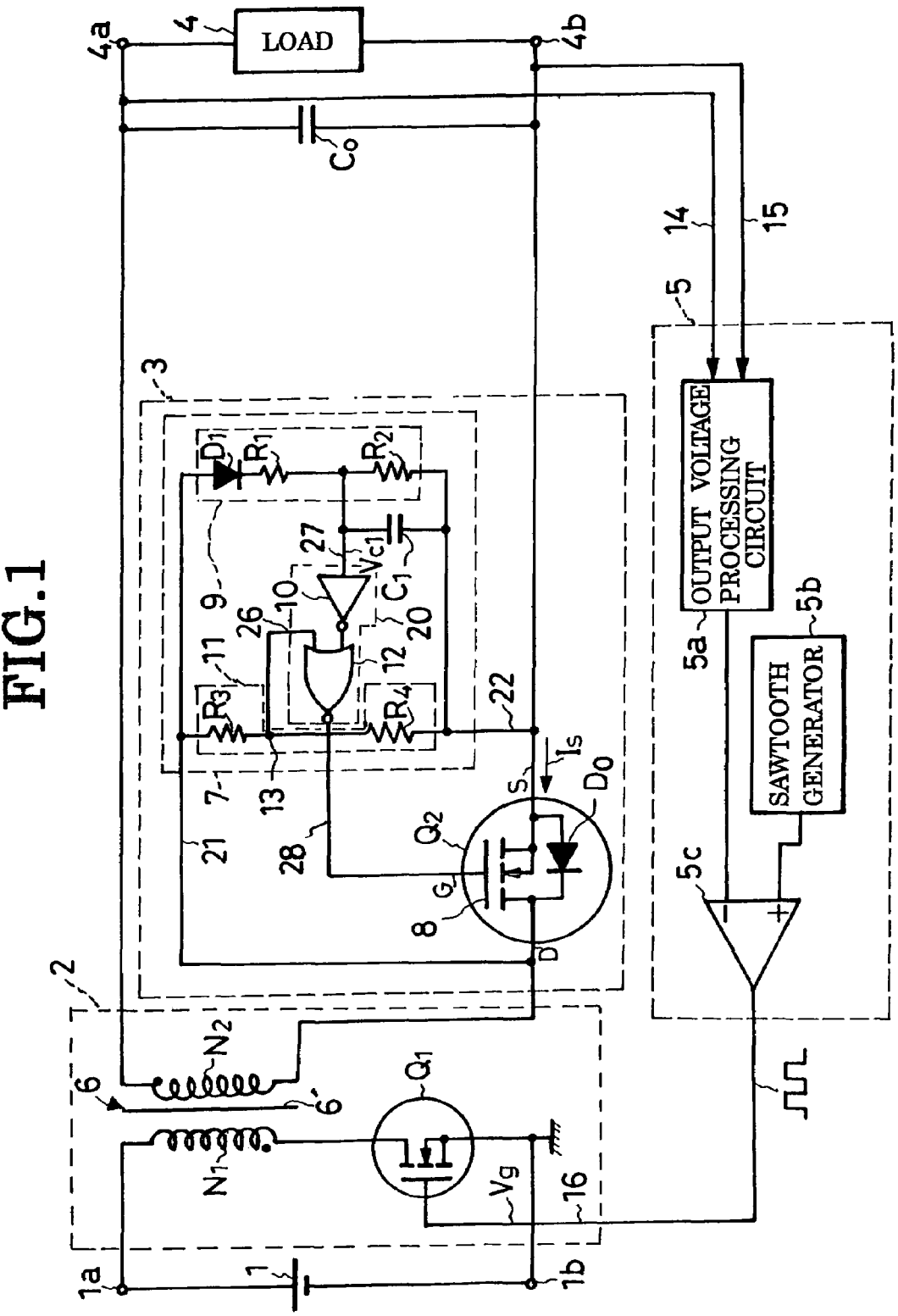
FIG. 1 is a schematic electrical diagram of the switching-mode power supply embodying the principles of this invention.

The present invention is currently believed to be best embodied in the switching-mode power supply of flyback DC-to-DC converter type diagramed in FIG. 1 of the above drawings. Broadly, the exemplified flyback DC-to-DC power supply comprises:

1. A pair of DC input terminals $1_a$ and $1_b$ as the DC input means.
2. A converter circuit 2 including an active switch $Q_1$ for switching the DC input on and off.
3. A synchronous rectifier circuit 3, to which the present invention particularly pertains, connected to the outputs of the converter circuit 2.
4. A pair of DC output terminals $4_a$ and $4_b$ as the DC output means connected to the converter circuit 2 via the synchronous rectifier circuit 3 and shown connected to a load 4 to be powered.
5. A switch control circuit 5 connected between the pair of DC output terminals $4_a$ and $4_b$ and the converter circuit 2 for controllably driving the active switch $Q_1$.
6. A smoothing capacitor $C_o$ connected between the pair of DC output terminals $4_a$ and $4_b$, although this capacitor in combination with the DC output terminals $4_a$ and $4_b$ might be collectively called DC output means.

The pair of DC input terminals $1_a$ and $1_b$ are shown connected to a source 1 of DC voltage. The DC voltage source 1 may be either a battery or a rectifier/filter circuit connected to a commercial source of AC power.

The converter circuit 2 includes a transformer 6 in addition to the active switch $Q_1$. The transformer 6 has a primary winding $N_1$ and secondary winding $N_2$, both coiled around a magnetic core 6' and electromagnetically coupled together. As indicated by the dots in FIG. 1, the transformer windings $N_1$ and $N_2$ are oppositely polarized with respect to each other in this particular embodiment. It is understood that the transformer 6 is additionally furnished with a tertiary winding, not shown, for powering the switch control circuit 5.

Shown as an insulated-gate field-effect transistor (IG-FET), the active switch $Q_1$ has a first main electrode or drain connected to the DC input terminal $1_a$ via the transformer primary $N_1$, a second main electrode or source connected to the other input terminal $_b$, which is grounded, and a control electrode or gate connected to the switch control circuit 5.

The transformer secondary $N_2$ has its opposite extremities coupled to the pair of DC output terminals $4_a$ and $4_b$ via the synchronous rectifier circuit 3 and smoothing capacitor $C_o$. The voltage across the transformer secondary $N_2$ is therefore rectified by the synchronous rectifier circuit 3 and smoothed by the smoothing capacitor $C_o$.

The synchronous rectifier circuit 3 is broadly divisible into a synchronous rectifier $Q_2$ and a synchronous rectifier control circuit 7. The synchronous rectifier $Q_2$ is also shown as an IGFET compounded of a switch 8 and a diode $D_0$ which are connected in parallel therewith. Constituting the major part of the IGFET, the synchronous rectifier switch 8 has a drain connected to the transformer secondary $N_2$, a source connected to the negative output terminal $4_b$, and a gate connected to the synchronous rectifier control circuit 7. The synchronous rectifier switch 8 is therefore in parallel with the serial circuit of the transformer secondary $N_2$ and smoothing capacitor $C_0$. The diode $D_0$ is built into the synchronous rectifier $Q_2$ by being formed on the same substrate, as of silicon, as the synchronous rectifier switch 8. This diode could, however, be a discrete part electrically connected in parallel with the synchronous rectifier switch.

In the case where the synchronous rectifier $Q_2$ is of a silicon semiconductor, the voltage drop across the synchronous rectifier switch 8 when it is closed is approximately 0.2 volt. The voltage drop across the conducting diode $D_0$ on the other hand is approximately 0.8 volt. A less voltage drop and less power loss will occur if the voltage across the transformer secondary $N_2$ is rectified while the synchronous rectifier switch 8 is held conducting, than if only the diode $D_0$ is conducting.

As the name implies, the synchronous rectifier control circuit 7 of the synchronous rectifier circuit 3 makes on/off control of the synchronous rectifier switch 8. It comprises:

1. A capacitor $C_1$ for providing a capacitor voltage $V_{c1}$, with a waveform diagramed at (C) in FIG. 2, indicative of whether the synchronous rectifier switch 8 may, and may not, be held conductive.

2. A charge/discharge circuit 9 through which the capacitor $C_1$ is to be charged and discharged according to whether the active switch is conductive or not.

3. A conduction period detector circuit 11 for ascertaining whether the active switch $Q_1$ is conductive or not.

4. A logic network 20 through which both capacitor $C_1$ and conduction period detector circuit 11 are connected to the gate of the synchronous rectifier switch 8 for causing conduction therethrough in relation to the conduction and nonconduction of the active switch $Q_1$.

It is understood that the capacitor $C_1$ of the synchronous rectifier control circuit 7 is less in capacitance than the smoothing capacitor $C_0$. The charge/discharge circuit 9 comprises a serial connection of diode $D_1$ and resistor $R_1$ for charging the capacitor $C_1$, and another resistor $R_2$ for discharging the same. The serial circuit of diode $D_1$ and resistor $R_1$ is connected to the drain D of the synchronous rectifier $Q_2$ by way of a conductor 21 on one hand and, on the other, to one terminal of the capacitor $C_1$. The other terminal of this capacitor $C_1$ is connected both to the source S of the synchronous rectifier $Q_2$ and to the DC output terminal $4_b$ by way of a conductor 22. The diode $D_1$ is so oriented as to be forward biased by the voltage induced across the transformer secondary $N_2$ during the conducting periods of the active switch $Q_1$. The resistor $R_2$ is connected in parallel with the capacitor $C_1$. The illustrated configuration of the charge/discharge circuit 9 is subject to a variety of modifications, as will be later referred to in more detail.

The conduction period detector circuit 11 of the synchronous rectifier control circuit 7 is a combination of two voltage-dividing resistors $R_3$ and $R_4$ interconnected in series and themselves connected between the drain D and source S of the synchronous rectifier $Q_2$. Thus the potential at the junction 13 between these voltage-dividing resistors $R_3$ and $R_4$ represents a predefined fraction of the voltage between the drain and source of the synchronous rectifier $Q_2$.

The potential at the junction 13 between the voltage-dividing resistors $R_3$ and $R_4$ switches between two values depending upon whether the active switch $Q_1$ is conducting or not. During the conducting periods of the active switch $Q_1$ the sum of the voltage across the transformer secondary $N_2$ and that across the smoothing capacitor $C_0$ is applied to the synchronous rectifier $Q_2$. The junction 13 between the voltage-dividing resistors $R_3$ and $R_4$ gains a high potential as that high voltage across the synchronous rectifier $Q_2$ is divided by the resistors $R_3$ and $R_4$. During the nonconducting periods of the active switch $Q_1$, on the other hand, the synchronous rectifier $Q_2$ conducts thereby causing the voltage between its drain and source to go low. The potential at the voltage-dividing resistor junction 13 also goes low. Thus the conduction period detector circuit 11 provides a binary signal indicative of the conduction or nonconduction of the active switch $Q_1$, for delivery to the logic network 20. The binary output from the conduction period detector circuit 11 is utilized by the logic network 20 for determination of the signal for driving the synchronous rectifier switch 8.

The logic network 20 of the synchronous rectifier control circuit 7 has a first input 26 connected to the conduction period detector circuit 11, a second input 27 connected to the capacitor $C_1$, and an output 28 connected to the gate G of the synchronous rectifier switch 8. The logic network 20 performs the following three functions for on/off control of the synchronous rectifier switch 8:

1. Comparison of the voltage $V_{c1}$ across the capacitor $C_1$ with a predefined voltage or threshold.

2. Determination of the moment the synchronous rectifier switch 8 is to be set out of conduction, on the basis of the moment the capacitor voltage $V_{c1}$ drops past the threshold.

3. Determination of the conducting periods of the synchronous rectifier switch 8 on the bases of the result of comparison of the capacitor voltage $V_{c1}$ with the threshold and the binary output from the conduction period detector circuit 11.

More specifically, in this particular embodiment, the logic network 20 comprises a NOT circuit 10 and NOR circuit 12. Connected to the capacitor $C_1$, the NOT circuit 10 goes low when the voltage across the capacitor is higher than the threshold, and high when the capacitor voltage is less than the threshold. Thus the NOT circuit 10 functions to shape the infinitely varying capacitor voltage into a binary signal.

Figure 2:
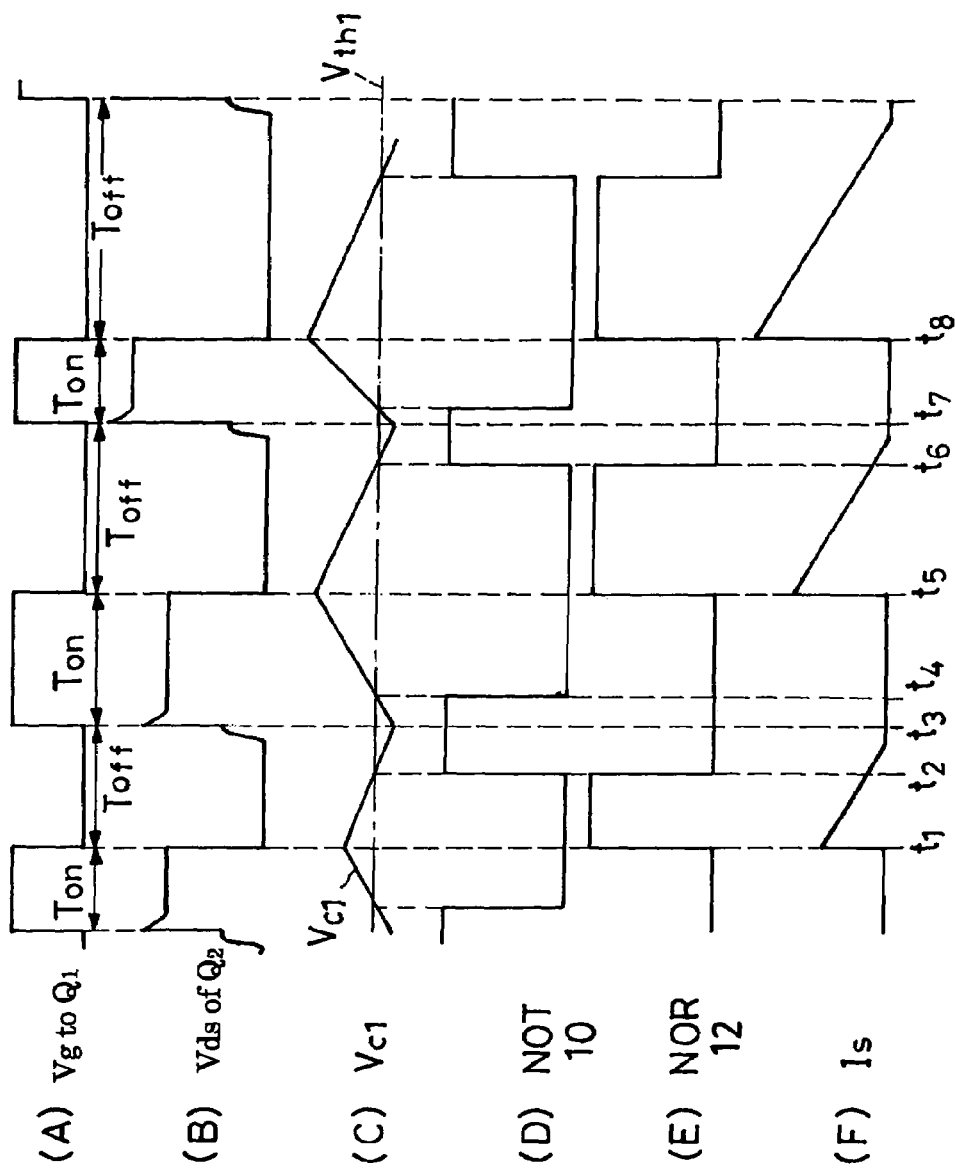
FIG. 2, consisting of (A) through (F), is a diagram showing waveforms appearing at various parts of FIG. 1 in proper time relationship to one another.

The above function of the NOT circuit 10 will be better understood from an inspection of (C) and (D) in FIG. 2. Shown at (C) in this figure is the voltage $V_{c1}$ across the capacitor $C_1$ and at (D) the output from the NOT circuit 10. The NOT circuit 10 has the threshold $V_{th1}$. The output from the NOT circuit 10 is high when the capacitor voltage $V_{c1}$ is less than the threshold $V_{th1}$, as from $t_2$ to $t_4$. The output from the NOT circuit 10 is low when the capacitor voltage $V_{c1}$ is higher than the threshold $V_{th1}$, as from $t_4$ to $t_6$. Thus, constantly comparing the continually varying input with the fixed value, the NOT circuit 10 translates the capacitor voltage $V_{c1}$ into the binary signal preparatory to delivery to the NOR circuit 12.

The NOR circuit 12 has one input connected to the NOT circuit 10, another input to the junction 13 between the voltage-dividing resistors $R_3$ and $R_4$ of the conduction period detector circuit 11, and an output to the gate G of the synchronous rectifier switch 8. Thus, as will be seen from (E) in FIG. 2, the NOR circuit 12 causes conduction through the synchronous rectifier switch 8, as from $t_1$ to $t_2$, when the inputs from the NOT circuit 10 and the conduction period detector circuit 11 are both low. In other words, the synchronous rectifier switch 8 conducts when the capacitor voltage $V_{c1}$ is higher than the threshold $V_{th1}$ and at the same time when the active switch $Q_1$ is off, designated $T_{off}$ at (A) in FIG. 2. It is understood that both NOT circuit 10 and NOR circuit 12 are energized from a DC power supply, not shown.

The smoothing capacitor $C_0$ is connected in parallel with the transformer secondary $N_2$ via the synchronous rectifier $Q_2$. The pair of DC output terminals $4_a$ and $4_b$ are connected across the smoothing capacitor $C_0$. The synchronous rectifier $Q_2$ and smoothing capacitor $C_0$ constitute in combination the rectifying and smoothing circuit for the output from the converter circuit 2.

With continued reference to FIG. 1, inserted in the feedback path from the pair of DC output terminals $4_a$ and $4_b$ to the converter circuit 2, the active switch control circuit 5 creates the pulse-width-modulated switch control signal $V_g$, shown at (A) in FIG. 2, thereby to drive the active switch $Q_1$ so as to keep the DC output voltage constant. The switch control circuit 5 includes an output voltage processing circuit $5_a$ having inputs connected to the DC output terminals $4_a$ and $4_b$ by way of conductors 14 and 15, respectively, for providing an output voltage signal indicative of the voltage between the pair of DC output terminals. The output voltage signal is a voltage signal in direct proportion with the DC output voltage in this embodiment, although it could be in inverse proportion with the DC output voltage. The output voltage processing circuit $5_a$ is connected to the negative input of a comparator $5_c$.

Also included in the switch control circuit 5 is a sawtooth generator $5_b$ which generates a sawtoothed voltage with a frequency of as high as from 20 kHz to 100 kHz. A triangular wave generator is a possible, obvious alternative to the sawtooth generator $5_b$. The sawtooth generator $5_b$ is connected to the positive input of the comparator $5_c$. The output from this comparator $5_c$ is the pulse-width-modulated switch control signal $V_g$, which is high when the sawtooth wave is higher than the output voltage signal. The switch control signal $V_g$ is delivered through the conductor 16 to the gate or equivalent control electrode of the active switch $Q_1$ in the converter circuit 2. The active switch $Q_1$ is "on", designated $T_{on}$ at (A) in FIG. 2, when the switch control signal $V_g$ is high, and off, designated $T_{off}$, when the switch control signal is low.

The pulse-width-modulated switch control signal $V_g$ is impressed between the gate and source of the active switch $Q_1$. The connection between the comparator Sc and the source of the active switch $Q_1$ is not shown in FIG. 1.

Although shown connected to the pair of DC output terminals $4_a$ and $4_b$ in FIG. 1, the switch control circuit 5 could be connected to the unshown tertiary winding of the transformer 2. Or, for that matter, it might be connected to any parts having a voltage in proportion with the DC output voltage. Optionally, moreover, the feedback circuit may contain an isolation mechanism such as the familiar optocouplers to isolate it from the DC output.

Operation

The DC voltage from the source 1 is applied to the transformer primary $N_1$ during each conducting period of the active switch 1. The transformer 6 stores the energy because then the switch 8 and diode $D_0$ of the synchronous rectifier $Q_2$ are both nonconductive. Assuming that the smoothing capacitor $C_0$ has been charged, the sum of the voltage across the transformer secondary $N_2$ and that across the smoothing capacitor $C_0$ will cause conduction through the diode $D_1$ of the charge/discharge circuit 9 during the conducting period $T_{on}$ of the active switch $Q_1$, as from $t_3$ to $t_5$ in FIG. 2. The capacitor $C_1$ of the synchronous rectifier control circuit 7 will then be charged with a prescribed time constant, so that the voltage $V_{c1}$ across the capacitor, at (C) in FIG. 2, will start building up with a gradient as at $t_3$. Then at $t_4$, when the capacitor voltage $V_{c1}$ reaches the threshold $V_{th1}$, the NOT circuit 10 will go low as at (D) in FIG. 2.

The active switch $Q_1$ is shown turned off at $t_5$ in FIG. 2 whereupon the energy that has been stored on the transformer 6 will be released. The transformer secondary $N_2$ will have induced thereon a voltage oriented in a direction opposite to that when the active switch $Q_1$ was "on." Thereupon, as indicated by the arrow in FIG. 1 and diagramed at (F) in FIG. 2, the current $I_s$ will flow along the path comprising the transformer secondary $N_2$, smoothing capacitor $C_o$, and synchronous rectifier $Q_2$. Containing the diode $D_o$, the synchronous rectifier $Q_2$ permits the flow of the current $I_s$ therethrough irrespective of whether the switch 8 is on or off.

As indicated at (B) in FIG. 2, the drain-source voltage $V_{ds}$ of the synchronous rectifier $Q_2$ becomes zero or nearly so when the active switch $Q_1$ is turned off at $t_5$. Both inputs to the NOR circuit 12 of the synchronous rectifier circuit 7 become low at that moment, so that it will go high as at (E) in FIG. 2. Applied between the gate G and source S of the synchronous rectifier circuit 2, this high output from the NOR circuit 12 will cause conduction through the synchronous rectifier switch 8. The current will then flow from source S toward drain D of the synchronous rectifier $Q_2$.

The charging of the capacitor $C_1$ of the synchronous rectifier control circuit 7 will terminate when the active switch $Q_1$ is turned off as at $t_5$ because then the drain-source voltage $V_{ds}$ of the synchronous rectifier $Q_2$ becomes zero or nearly so as aforesaid. Then the capacitor $C_1$ will start discharging through the resistor $R_2$ of the charge/discharge circuit 9 with a predetermined time constant. At (C) in FIG. 2 is shown the capacitor voltage $V_{c1}$ as diminishing as from $t_5$ to $t_7$.

Then, at $t_6$, when the capacitor voltage $V_{c1}$ drops to the threshold $V_{th1}$, the NOT circuit 10 will go high as at (D) in FIG. 2. The NOR circuit 12 will go low, as at (E) in FIG. 2, in response to the high output from the NOT circuit 10, thereby causing nonconduction through the synchronous rectifier switch 8. The current $I_s$ will continue flowing through the diode $D_o$ of the synchronous rectifier $Q_2$ after the switch 8 has turned off. As will be understood from (F) in FIG. 2, the current $I_s$ will flow only through the diode $D_o$ for such a brief length of time, and will be of such small magnitude, that in practice there will be no risk of the diode being ruptured.

The advantages gained by the foregoing embodiment of the invention may be recapitulated as follows:

1. The conducting periods of the synchronous rectifier switch 8 is automatically timed to the nonconducting periods of the active switch $Q_1$ by the synchronous rectifier control circuit 7 of simplified configuration including the logic network 20, so that the synchronous rectifier switch is never to turn on during the conducting periods of the active switch.

2. The length of the conducting periods of the synchronous rectifier switch 8 is accurately and easily adjustable by the charge and discharge time constants of the capacitor $C_1$ of the synchronous rectifier circuit 7 and the threshold value of the NOT circuit 10.

The first recited advantage will be better appreciated by considering the case where the synchronous rectifier switch 8 is set into conduction while the active switch $Q_1$ is conducting. Then, if the synchronous rectifier switch 8 permits bidirectional current flow therethrough, the current will flow from transformer secondary $N_2$ to synchronous rectifier switch 8, preventing proper rectification and possibly causing noise production and circuit destruction. No such troubles will occur in the FIG. 1 apparatus as the synchronous rectifier switch 8 conducts only during the nonconduction of the active switch $Q_1$.

Figure 3:
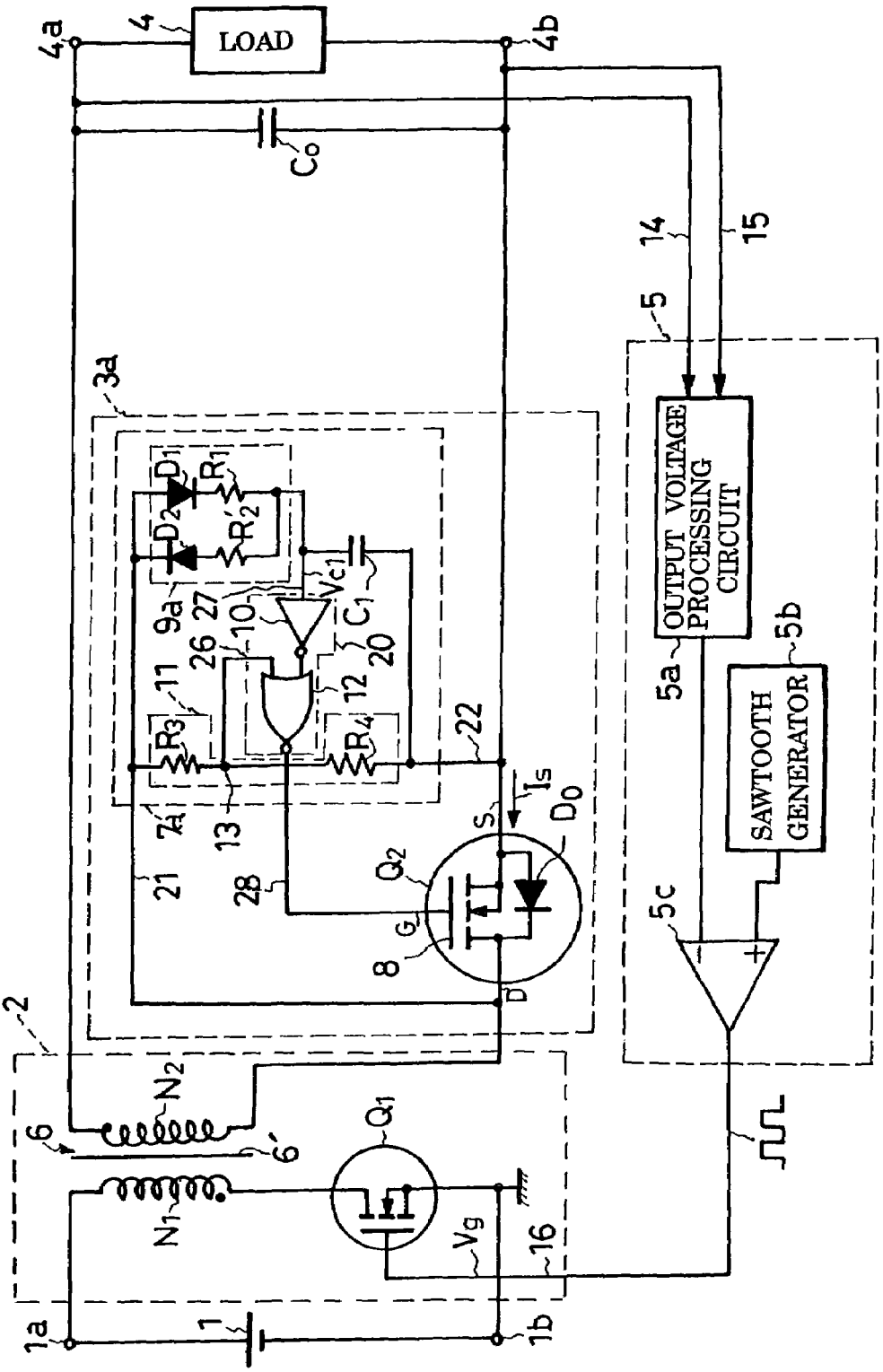
FIG. 3 is a schematic electrical diagram of another preferred form of switching-mode power supply embodying the invention.

Embodiment of FIG. 3

The second preferred form of switching-mode power supply shown in FIG. 3 incorporates a modified synchronous rectifier circuit $3_a$ and is identical with the FIG. 1 embodiment in all the other details of construction. The modified synchronous rectifier $3_a$ differs from its FIG. 1 counterpart 3 only in its synchronous rectifier control circuit $7_a$, which in turn differs from its FIG. 1 counterpart 7 only in its charge/discharge circuit $9_a$.

The modified charge/discharge circuit $9_a$ features a discharge circuit of a resistor $R_2'$ and diode $D_2$ interconnected in series, instead of the discharge resistor $R_2$ of the FIG. 1 charge/discharge circuit 9. This discharge circuit is connected in parallel with the charge circuit comprised of the diode $D_1$ and resistor $R_1$ which are interconnected in series as in the FIG. 1 embodiment. The charge diode $D_1$ and discharge diode $D_2$ are opposite in polarity.

The second preferred form of switching-mode power supply operates like that of FIG. 1 except for the path of the current discharged from the capacitor $C_1$ of the synchronous rectifier control circuit $7_a$, so that the waveform timing diagram of FIG. 2 applies to this embodiment as well. The current discharged from the capacitor $C_1$ during the periods of $t_1$–$t_3$, $t_5$–$t_7$, etc., flows along the path comprising the discharge resistor $R_2'$, discharge diode $D_2$, and synchronous rectifier switch 8.

Figure 4:
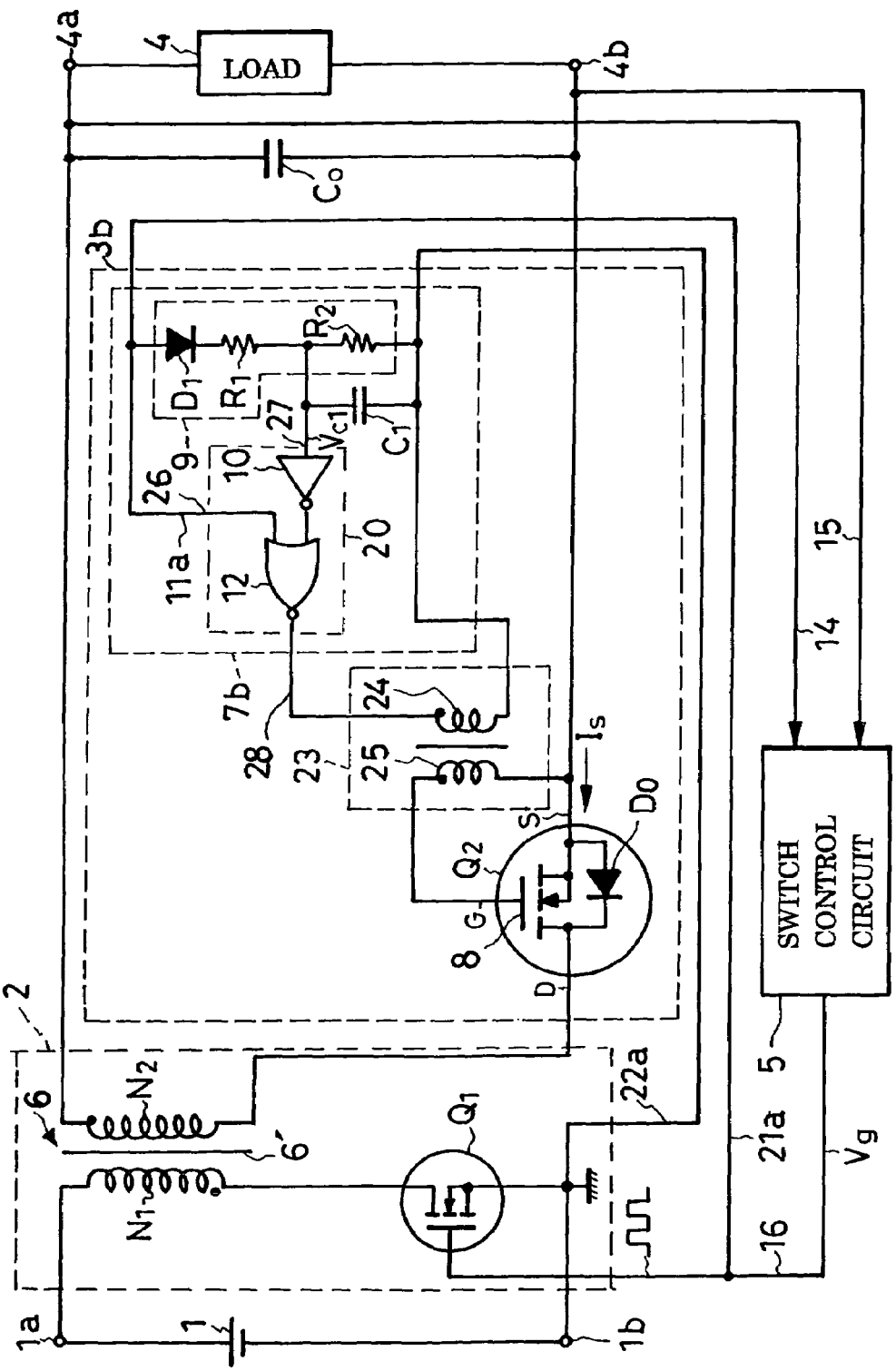
FIG. 4 is a schematic electrical diagram of still another preferred form of switching-mode power supply embodying the invention.

Embodiment of FIG. 4

This third preferred form of switching-mode power supply features another modified synchronous rectifier control circuit $7_b$ and an isolating transformer 23. These two components together with the synchronous rectifier $Q_2$ constitute in combination a modified synchronous rectifier circuit $3_b$. All the other details of construction are as previously described with reference to FIG. 1.

The synchronous rectifier control circuit $7_b$ has an input connected by way of a conductor $21_a$ to the output conductor 16 of the active switch control circuit 5, and another input connected by way of a conductor $22_a$ to the grounded DC input terminal $1_b$. Thus the synchronous rectifier control circuit $7_b$ inputs the pulse-width-modulated switch control signal $V_g$, shown at (A) in FIG. 2, which is delivered from the switch control circuit 5 to the active switch $Q_1$ thereby to drive the same so as to keep the DC output voltage constant. Instead, unlike its FIG. 1 counterpart 7, the synchronous rectifier control circuit $7_b$ has no conductors 21 and 22 connecting the same to the drain and source of the synchronous rectifier circuit $Q_2$.

Internally, the synchronous rectifier control circuit $7_b$ is configured just like its FIG. 1 counterpart 7. The capacitor $C_1$ for determination of the conducting periods of the synchronous rectifier switch 8 is connected between the pair of input conductors $21_a$ and $22_a$. The NOR circuit 12 has one input connected by way of a conductor $11_a$ to the input conductor $21_a$ for inputting the switch control signal $V_g$, and another input to the NOT circuit 10.

The isolating transformer 23 has a primary winding 24 connected between the output of the NOR circuit 12 and the grounded conductor $22_a$. It is understood that the unshown power supply for the NOT circuit 10 and NOR circuit 12 provides a preassigned voltage based upon the grounded conductor $22_a$. The secondary winding 25 of the isolating transformer 23 is connected between the gate and source of the synchronous rectifier $Q_2$.

The synchronous rectifier control circuit $7_b$ operates like its FIG. 1 counterpart 7 except that the capacitor $C_1$ is charged as dictated by the switch control signal $V_g$ being impressed to the active switch $Q_1$. The operation of the complete apparatus is therefore considered self-evident from FIG. 2.

Figure 5:
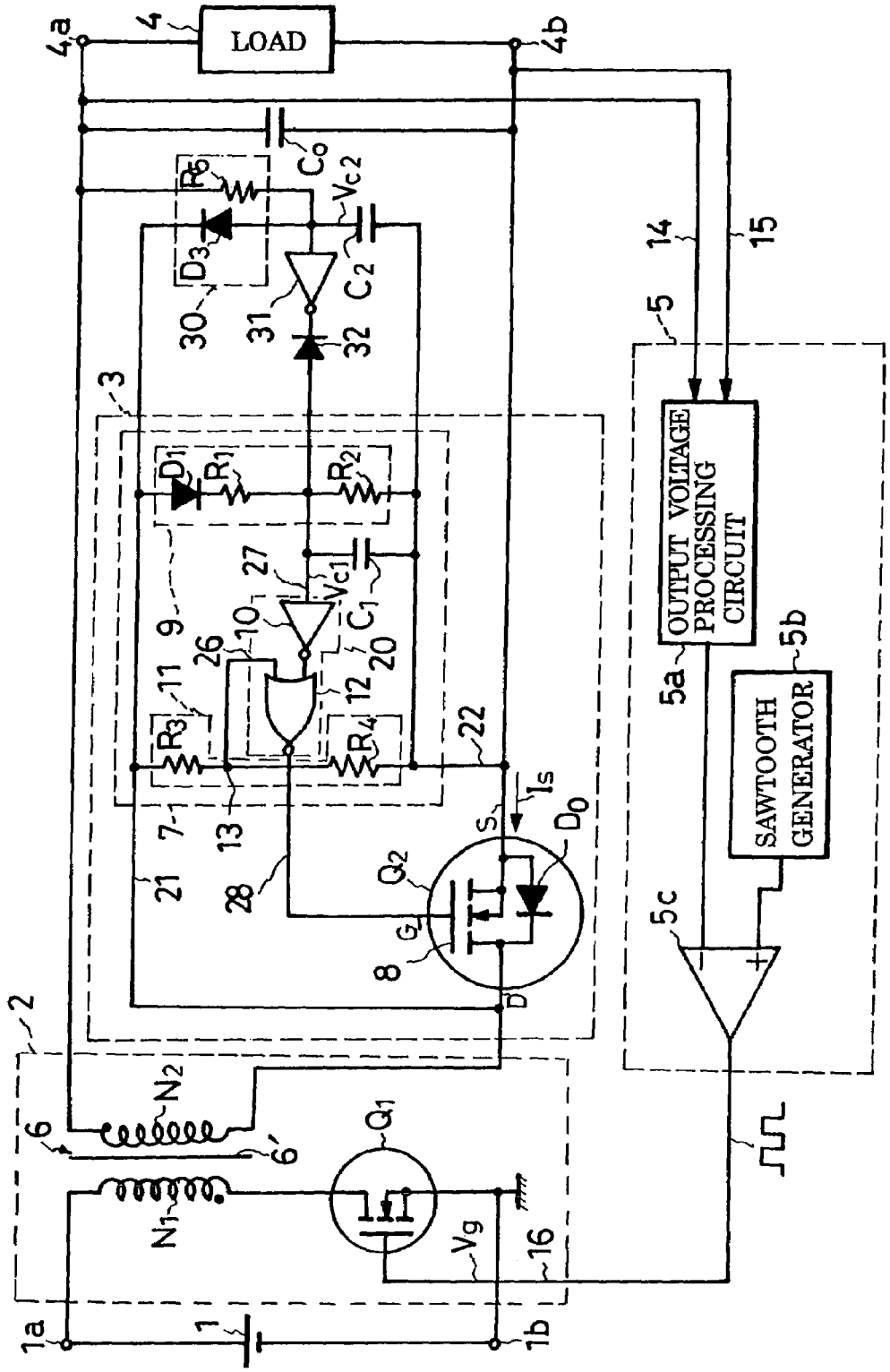
FIG. 5 is a schematic electrical diagram of yet another preferred form of switching-mode power supply embodying the invention.

Embodiment of FIG. 5

The fourth preferred form of switching-mode power supply is akin to the FIG. 1 embodiment except for the addition of circuit means for limiting the conducting periods of the synchronous rectifier switch 8. The conduction limiter circuit, as it might be so called, includes a second capacitor $C_2$ (first capacitor being seen at $C_1$ in the synchronous rectifier control circuit 7) and a charge/discharge circuit 30 therefor. The charge/discharge circuit 30 comprises a charge resistor $R_5$ and a discharge diode $D_3$. The charge resistor $R_5$ is connected between the positive DC output terminal $4_a$ and one terminal of the second capacitor $C_2$, the other terminal of which is connected to the negative DC output terminal $4_b$ by way of the conductor 22. The discharge diode $D_3$ has its anode connected to the capacitor $C_2$ and its cathode to the conductor 21.

Also included in the conduction limiter circuit is a NOT circuit 31 which has its input connected to the second capacitor $C_2$ for shaping the voltage across the second capacitor into a binary conduction limiter output signal. The output of the NOT circuit 31 is connected via a diode 32 to the first capacitor $C_1$ of the synchronous rectifier control circuit 7. The diode 32 has its anode connected to the first capacitor $C_1$, and its cathode to the NOT circuit 31, for providing a compulsory discharge path for the capacitor.

Figure 6:
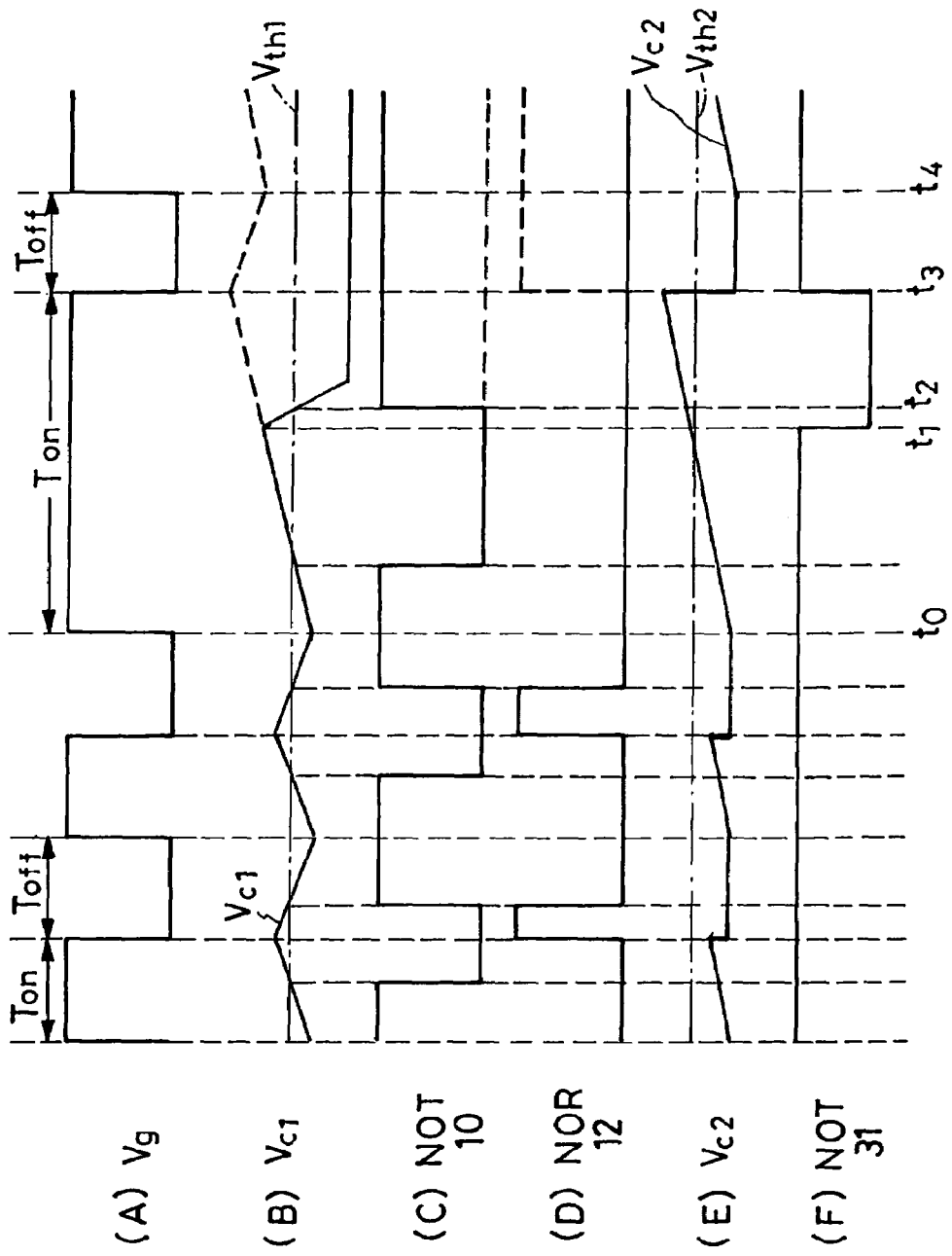
FIG. 6, consisting of (A) through (F), is a diagram showing waveforms appearing at various parts of FIG. 5 in proper time relationship to one another.

The FIG. 5 power supply is similar in operation to that of FIG. 1 except for its conduction limiter circuit. Reference may be had to FIG. 6 for the following operational description of the conduction limiter circuit. This figure indicates at (A) the switch control signal $V_g$ for the active switch $Q_1$, at (B) the voltage $V_{c1}$ across the first capacitor $C_1$ for determination of the conducting periods of the synchronous rectifier switch 8, at (C) the output from the NOT circuit 10 of the synchronous rectifier control circuit 7, at (D) the output from the NOR circuit 12 of the synchronous rectifier control circuit 7, at (E) the voltage $V_{c2}$ across the second capacitor $C_2$ of the conduction limiter circuit, and at (F) the output from the NOT circuit 31 of the conduction limiter circuit.

The waveforms of FIG. 6 are plotted on the assumption that the power supply had been operating normally until $t_0$ or $t_1$ and that then the conducting period of the synchronous rectifier switch 8 became longer than normal. The capacitor $C_2$ of the conduction limiter circuit is charged during the conducting periods $T_{on}$ of the active switch $Q_1$ by way of the path comprising smoothing capacitor $C_o$ and charging resistor $R_5$. During the nonconducting periods $T_{off}$ of the active switch $Q_1$, on the other hand, the capacitor $C_2$ discharges by way of the path comprising the discharge diode $D_3$ and synchronous rectifier switch 8, the path comprising the diode $D_3$ and the diode $D_1$ and resistors $R_1$ and $R_2$ of the charge/discharge circuit 9, and the path comprising the discharge diode $D_3$ and the resistors $R_3$ and $R_4$ of the synchronous rectifier control circuit 7. A rapid discharge will occur, as at (E) in FIG. 6, so small being the discharge time constant of the path comprising the discharge diode $D_3$ and synchronous rectifier switch 8.

As will be understood from (E) in FIG. 6, the capacitor $C_2$ of the conduction limiter circuit is so made that the voltage $V_{c2}$ across the same never builds up to the threshold $V_{th2}$ of the NOT circuit 31 as long as the power supply is operating normally. The NOT circuit 31 has therefore been high until $t_1$, as at (F) in FIG. 6. The diode 32 has been reverse biased, blocking the discharge path of the capacitor $C_1$. The operation of the complete power supply to this moment is as described above with reference to FIG. 2.

In the event of an abnormal drop in the DC output voltage due to a sudden rise in the voltage requirement of the load 4, the active switch $Q_1$ will stay conductive, as at (A) in FIG. 6, even after $t_1$ when the voltage $V_{c2}$ across the second capacitor $C_2$ grows higher than the threshold $V_{th2}$ of the NOT circuit 31 as at (E) in FIG. 6. Thereupon the NOT circuit 31 will go low as at (F) in FIG. 6. The diode 32 will then be forward biased and so become conductive, thereby creating a compulsory discharge path comprising the first capacitor $C_1$, diode 32, and NOT circuit 31. The voltage $V_{c1}$ across the first capacitor $C_1$ will start diminishing at $t_1$, as at (B) in FIG. 6. Then, at $t_2$, when the first capacitor voltage $V_{c1}$ drops below the threshold $V_{th1}$ of the NOT circuit 10, this NOT circuit will go high as at (C) in FIG. 6. Thus disabled, the NOR circuit 12 will be prevented from causing conduction through the synchronous rectifier switch 8.

The active switch $Q_1$ is shown to turn off at $t_3$ and remain so until $t_4$. During this $t_3$–$t_4$ nonconducting period $T_{off}$ the transformer 6 will release its energy from its secondary $N_2$ along the path comprising the smoothing capacitor $C_o$ and the diode $D_o$ of the synchronous rectifier $Q_2$. The synchronous rectifier switch 8 is also off during the $t_3$–$t_4$ period, performing no synchronous rectification. However, this period of no synchronous rectification is so brief compared to that of synchronous rectification that the synchronous rectifier $Q_2$ will experience no such temperature rise as to incur its own destruction. The NOT circuit 31 goes high at $t_3$, as at (F) in FIG. 6, when the second capacitor $C_2$ discharges as at (E) in FIG. 6.

Let us assume that the capacitor $C_1$ of the synchronous rectifier control circuit 7 was not compulsorily discharged in response to the output from the NOT circuit 31. Then, as indicated by the dashed line at (B) in FIG. 6, the voltage $V_{c1}$ across this capacitor $C_1$ would continue building up after $t_1$, until $t_3$ when the active switch $Q_1$ went out of conduction. Then the capacitor voltage $V_{c1}$ would decline from $t_3$ to $t_4$, during which period the active switch $Q_1$ was off. As indicated also by the dashed line at (C) in FIG. 6, the NOT circuit 10 would stay low as long as the capacitor voltage $V_{c1}$ was above its threshold $V_{th1}$.

At $t_3$, when the active switch $Q_1$ turned off, the diode $D_o$ of the synchronous rectifier $Q_2$ would turn on, so that the conduction period detector circuit 11 of the synchronous rectifier control circuit 7 would go low. Then the NOR circuit 12 would go high at $t_3$, as indicated by the dashed line at (D) in FIG. 6, thereby causing conduction through the synchronous rectifier switch 8.

If the duration of the ensuing $t_3$–$t_4$ nonconducting period $T_{off}$ is shot, the voltage $V_{c1}$ across the capacitor $C_1$ of the synchronous rectifier control circuit 7 would be kept higher than the threshold $V_{th1}$ of the NOT circuit 10. The NOR circuit 12 would therefore remain high after $t_4$ when the active switch $Q_1$ was rendered conductive. Both active switch $Q_1$ and synchronous rectifier switch 8 would then be conductive after $t_4$. This certainly is a grave malfunctioning of the switching-mode power supply, giving rise to noise problems and possible rupture of the associated circuit elements.

By contrast, in this FIG. 5 embodiment, the synchronous rectifier switch 8 does not turn on at $t_3$ and remains off even after $t_4$ when the active switch $Q_1$ turns on, all as indicated by the solid lines in FIG. 6. Concurrent closure of both active switch $Q_1$ and synchronous rectifier switch 8 is thus avoided. The conduction limiter circuit introduced in this embodiment is applicable to all the other embodiments disclosed herein.

Figure 7:
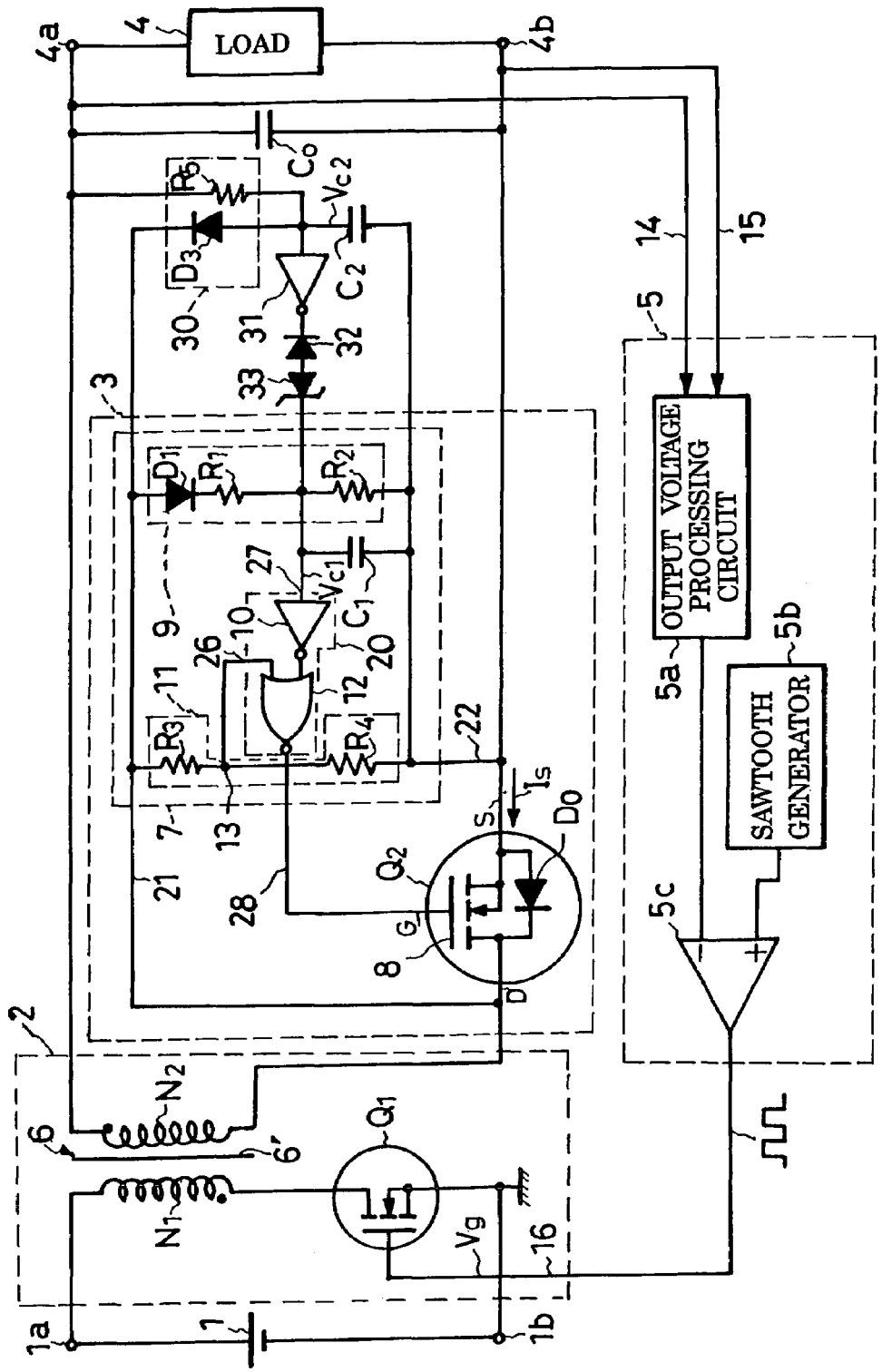
FIG. 7 is a schematic electrical diagram of a further preferred form of switching-mode power supply embodying the invention.

Embodiment of FIG. 7

A voltage-regulating zener diode 33 is newly incorporated in this FIG. 7 embodiment, which is otherwise identical in construction with that of FIG. 5. The zener diode 33 is connected between the capacitor $C_1$ of the synchronous rectifier control circuit 7 and the diode 32 of the conduction limiter circuit. Oriented opposite to the diode 32, the zener diode conducts when the voltage $V_{c1}$ develops across the capacitor $C_1$ above a prescribed limit.

Figure 8:
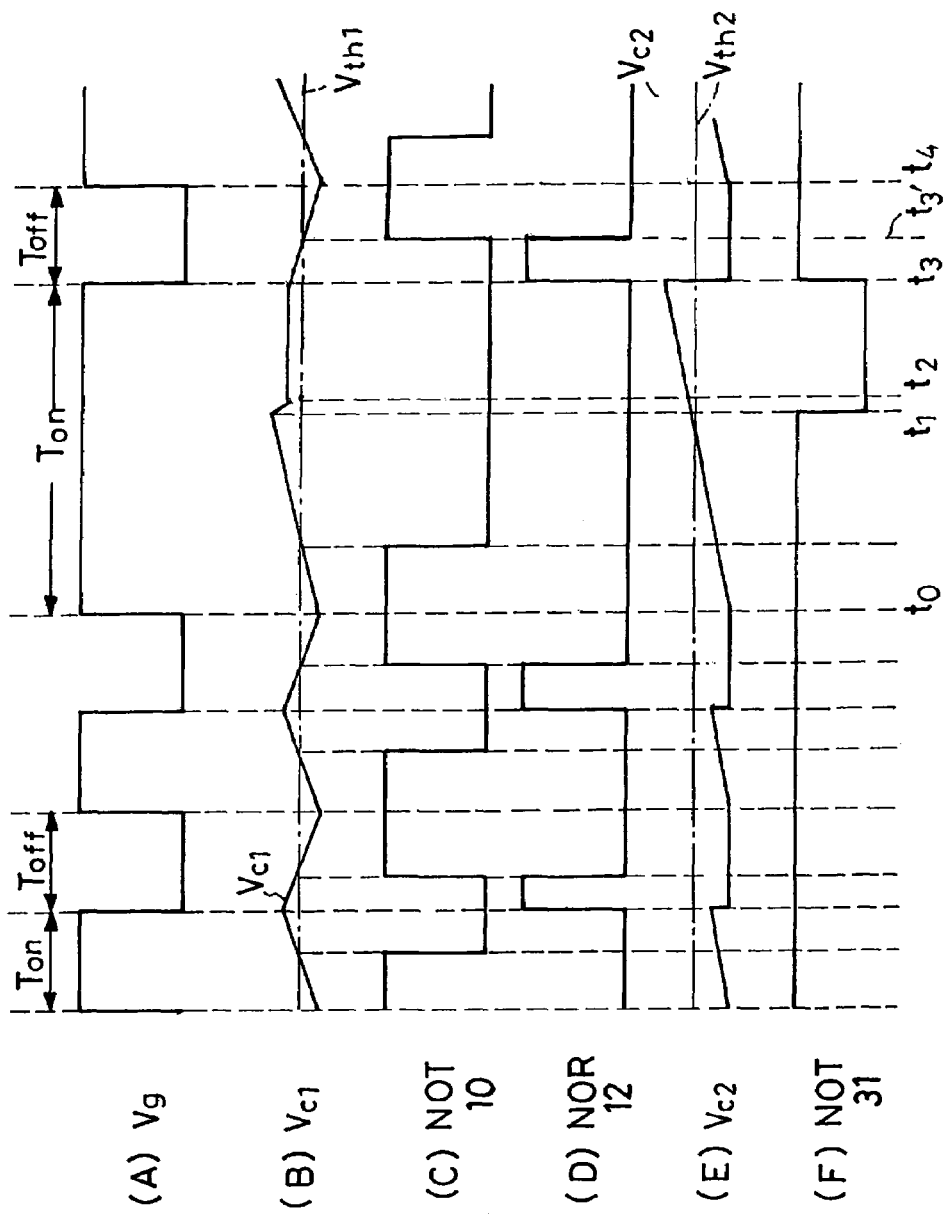
FIG. 8, consisting of (A) through (F), is a diagram showing waveforms appearing at various parts of FIG. 7 in proper time relationship to one another.

The operation of this power supply will become apparent from a consideration of FIG. 8, which shows the waveforms appearing at the same parts of the FIG. 7 embodiment as those of the FIG. 5 embodiment at which appear the waveforms given in FIG. 6. A comparison of FIGS. 6 and 8 will further reveal that the waveforms (A), (E) and (F) are the same in both figures.

When the NOT circuit 31 of the conduction limiter circuit goes low at $t_1$, as at (F) in FIG. 8, the current discharged from the capacitor $C_1$ of the synchronous rectifier control circuit 7 will flow into the NOT circuit 31 via the zener diode 33 and diode 32. As seen at (B) in FIG. 8, the voltage $V_{c1}$ across the capacitor $C_1$ will dwindle from $t_1$ to $t_2$, the latter being the moment the capacitor voltage becomes less than the sum of the zener voltage of the zener diode 33 and the voltage across the diode 32. Then the zener diode 33 will become nonconductive, terminating the discharge of the capacitor $C_1$, with the result that the capacitor voltage $V_{c1}$ is maintained thereafter at the value at $t_2$ which is equal to the zener voltage.

This value of the capacitor voltage $V_{c1}$ is shown to be slightly higher than the threshold $V_{th1}$ of the NOT circuit 10 of the synchronous rectifier control circuit 7 at (B) in FIG. 8. Then the capacitor voltage $V_{c1}$ will start diminishing at $t_3$, when the active switch $Q_1$ goes off as at (A) in FIG. 8, and keep doing so until $t_3'$ when the capacitor voltage becomes less than the threshold $V_{th1}$ of the NOT circuit 10. Both inputs to the NOR circuit 12 of the synchronous rectifier control circuit 7 are therefore low from $t_3$ to $t_3'$, so that its output is high as at (D) in FIG. 8, causing conduction through the synchronous rectifier switch 8.

The synchronous rectifier switch 8 will go off at $t_3'$ when the capacitor voltage $V_{c1}$ becomes less than the threshold $V_{th1}$ of the NOT circuit 10 as above, because then the NOT circuit 10 will go high as at (C) in FIG. 8 thereby causing the NOR circuit 12 to go low.

The FIG. 7 embodiment offers the advantage, in addition to those set forth in conjunction with that of FIG. 1, that the high periods of the NOR circuit 12 are variable through adjustment of the zener voltage of the zener diode 33. An adjustment of the high periods of the NOR circuit 12 is tantamount to that of the conducting periods of the synchronous rectifier switch 8.

It will be apparent that the serial circuit of the discharge resistor $R_2'$ and diode $D_2$, FIG. 3, is adoptable in substitution for the discharge resistor $R_2$ in the embodiments of FIGS. 5 and 7. An equivalent of the conduction limiter circuit of FIG. 5 or 7 may be added to the FIG. 4 embodiment as well.

Figure 9:
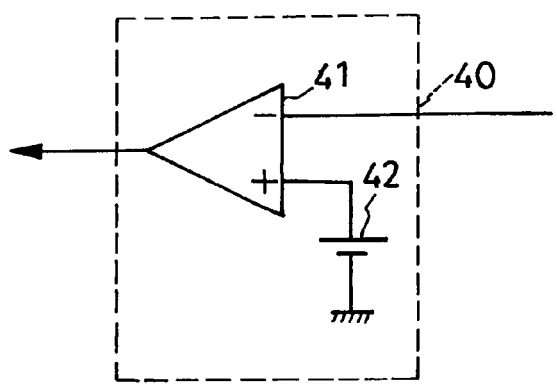
FIG. 9 is a schematic electrical diagram of a wave-shaping circuit for use in the FIG. 1 embodiment in place of the NOT circuit of its synchronous rectifier control circuit.

Embodiment of FIG. 9

A wave-shaping circuit shown at 40 in FIG. 9 finds use in the switching-mode power supply of FIG. 1 in place of the NOT circuit 10 of the synchronous rectifier control circuit 7. The wave-shaping circuit 40 includes a comparator 41 having a negative input connected to the capacitor $C_1$, FIG. 1, and a positive input connected to a reference voltage source 42. The reference voltage source 42 provides a voltage functionally equivalent to the threshold voltage $V_{th1}$ of the NOT circuit 10. The output of the comparator 41 is coupled to one of the inputs of the NOR circuit 12, FIG. 1.

It is now apparent that just like the NOT circuit 10, the wave-shaping circuit 40 functions to convert the voltage $V_{c1}$ across the capacitor $C_1$ into a binary signal prior to application to the NOR circuit 12. This wave-shaping circuit may be employed in lieu of the NOT circuit 10 in FIGS. 3, 4, 5 and 7 and of the NOT circuit 31 in FIGS. 5 and 7.

Figure 10:
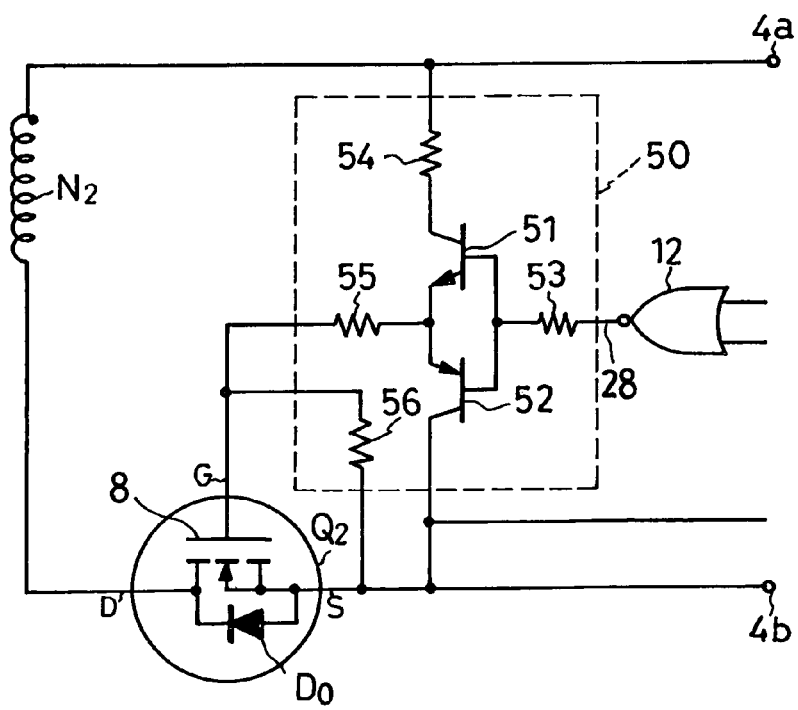
FIG. 10 is a partial schematic electrical diagram of a further preferred form of switching-mode power supply embodying the invention.

Embodiment of FIG. 10

A synchronous rectifier switch driver circuit 50, FIG. 10, may be inserted between the NOR circuit 12 of the synchronous switch control circuit and the gate G of the synchronous rectifier switch 8, in any of the foregoing embodiments of the invention.

The switch driver circuit 50 includes an npn transistor 51 and a pnp transistor 52 which have their bases interconnected and further connected to the NOR circuit 12 via a resistor 53. The transistor 51 has its collector connected to the DC output terminal $4_a$ via a resistor 54 whereas the other transistor 52 has its collector connected to the other DC output terminal $4_b$. The emitters of both transistors 51 and 52 are interconnected and further connected to the gate G of the synchronous rectifier $Q_2$ via a resistor 55. Another resistor 56 is connected between the gate G and source S of the synchronous rectifier $Q_2$.

The transistor 51 conducts each time the NOR circuit 12 goes high, causing conduction through the synchronous rectifier switch 8. The same switch driver circuit could be added to any of the embodiments of FIGS. 2, 5 and 7.

Figure 11:
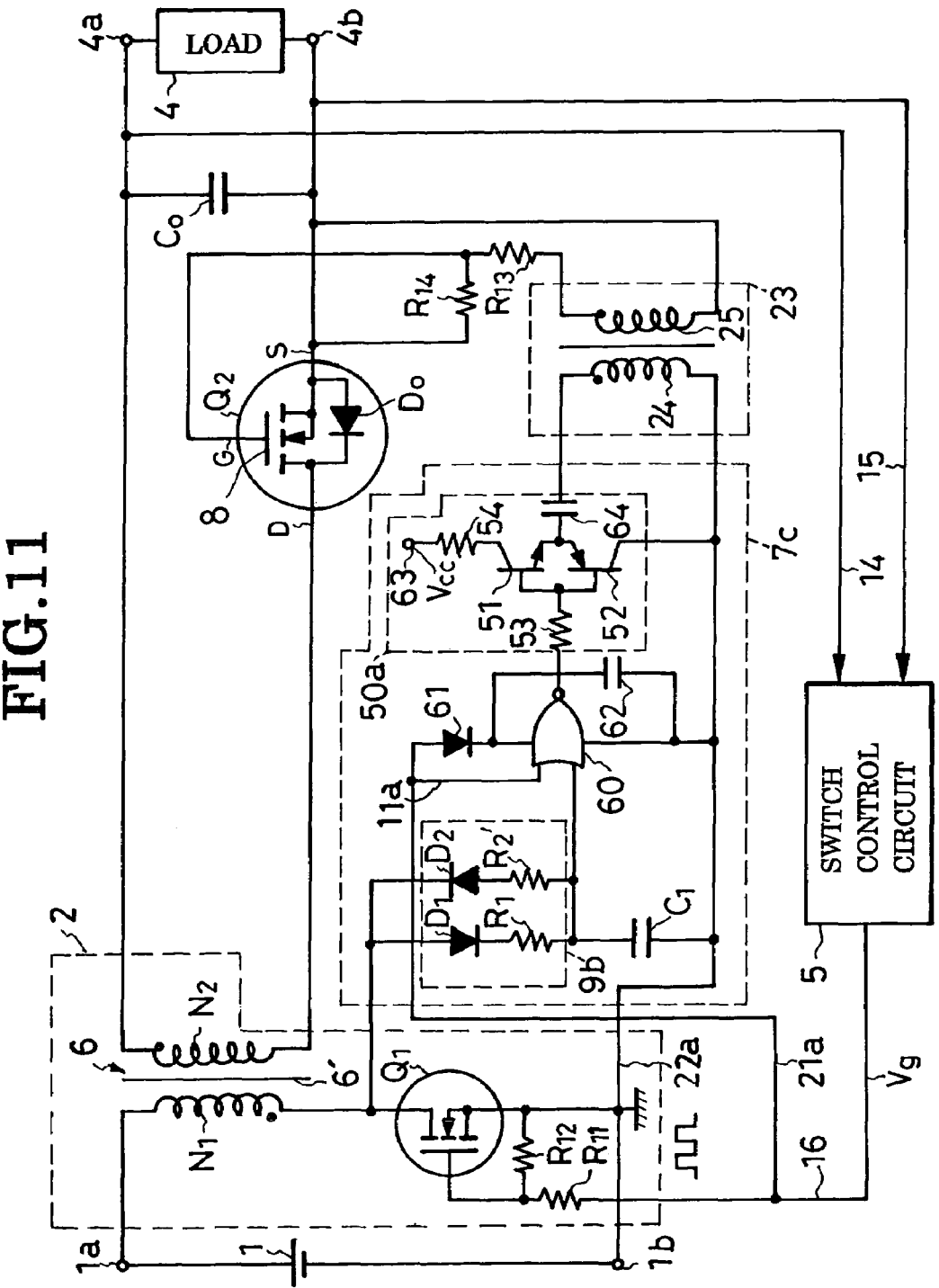
FIG. 11 is a schematic electrical diagram of a further preferred form of switching-mode power supply embodying the invention.

Embodiment of FIG. 11

This embodiment is similar in construction to that of FIG. 1 except for a modified synchronous rectifier control circuit $7_c$ which has inputs connected to the transformer primary $N_1$ and outputs connected to the synchronous rectifier circuit 8 via an isolating transformer 23. The synchronous rectifier control circuit $7_c$ is functionally equivalent to its FIG. 1 counterpart 7. The isolating transformer 23 is both functionally and constructionally identical with that designated by the same reference numeral in FIG. 4.

The modified synchronous rectifier control circuit $7_c$ includes the capacitor $C_1$ having one electrode connected to the drain of the active switch $Q_1$ via a charge/discharge circuit $9_b$. The other electrode of the capacitor $C_1$ is connected to the source of the active switch $Q_1$.

Like its FIG. 3 counterpart $9_a$, the charge/discharge circuit $9_b$ comprises a serial connection of a charge diode $D_1$ and charge resistor $R_1$ and a serial connection of a discharge diode $D_2$ and discharge resistor $R_2'$. The charge resistor $R_1$ has one extremity connected to the drain of the active switch $Q_1$ via the charge diode $D_1$ and another extremity connected to the capacitor $C_1$. The discharge resistor $R_2'$ has one extremity connected to the drain of the active switch $Q_1$ via the discharge diode $D_2$ and another extremity connected to the capacitor $C_1$. Thus, via the charge/discharge circuit $9_b$, the capacitor $C_1$ is charged during the nonconducting periods of the active switch $Q_1$ and discharges during the conducting periods of the active switch.

Another component of the modified synchronous rectifier control circuit $7_c$ is a NOR circuit 60 which is functionally akin to the logic network 20 of the FIG. 1 embodiment. The NOR circuit 60 has one input connected via the conductor $11_a$ to the conductor $21_a$ for inputting the switch control signal $V_g$ being applied from switch control circuit 5 to active switch $Q_1$. Another input of the NOR circuit 60 is connected to the capacitor $C_1$. Between the pair of supply terminals of the NOR circuit 60 is connected a capacitor 62 by way of a power supply therefor. The capacitor 62 has one electrode connected via a rectifier diode 61 to the conductor $21_a$ and the other electrode to the source of the active switch $Q_1$.

Figure 12:
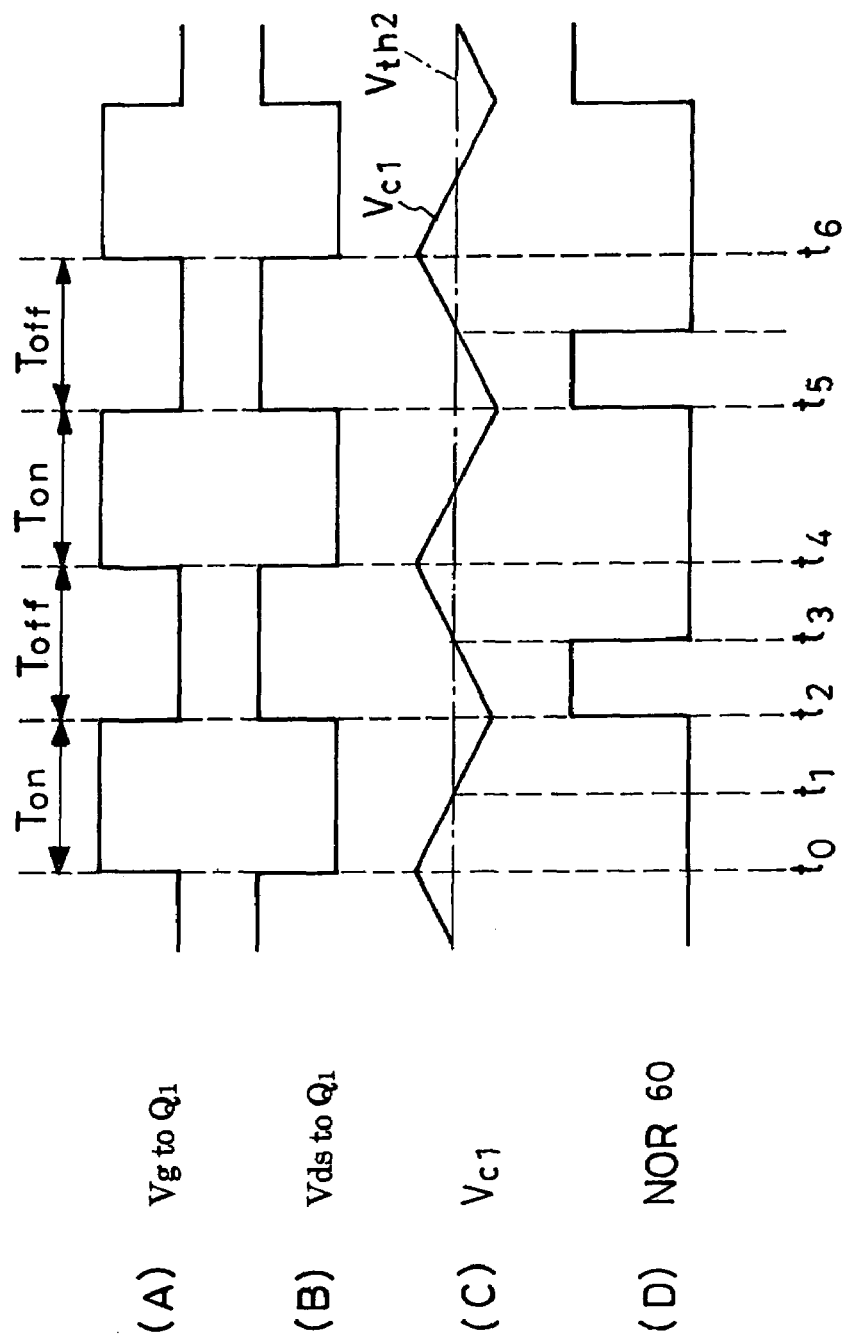
FIG. 12, consisting of (A) through (D), is a diagram showing waveforms appearing at various parts of FIG. 11 in proper time relationship to one another.

The NOR circuit 60 compares the incoming voltage across the capacitor $C_1$ with a predetermined threshold $V_{th2}$, FIG. 12 (C), and further compares the resulting binary signal with the switch control signal $V_g$. As is apparent from (A), (C) and (D) in FIG. 12, the NOR circuit 60 goes high for causing conduction through the synchronous rectifier switch 8 when the voltage $V_{c1}$ across the capacitor $C_1$ is less than the threshold $V_{th2}$ and, at the same time, when the active switch $Q_1$ is off.

A comparison of (A) and (C) in FIG. 12 will further reveal that the capacitor $C_1$ is charged during the nonconducting periods $T_{off}$ of the active switch $Q_1$ and discharges during the conducting periods $T_{on}$ thereof. This is a reversal of the case, indicated at (A) and (C) in FIG. 2, for the capacitor $C_1$ of the FIG. 1 embodiment.

The modified synchronous rectifier control circuit $7_c$ is shown as further comprising a synchronous rectifier switch driver circuit $50_a$. Like its FIG. 10 counterpart 50 this driver circuit $50_a$ comprises two transistors 51 and 52 and two resistors 53 and 54. The transistor 51 has its collector connected via the resistor 54 to a source 63 of a supply voltage $V_{cc}$ whereas the other transistor 52 has its collector connected to the grounded conductor $22_a$. The emitters of both transistors 51 and 52 are both connected to a coupling capacitor 64, thence to the isolating transformer 23, and thence to the synchronous rectifier switch 8.

Additionally, in this FIG. 11 embodiment, the switch control circuit 5 is connected to the active switch $Q_1$ via two resistors $R_{11}$ and $R_{12}$. The transformer 23 is likewise connected to the synchronous rectifier switch 8 via two resistors $R_{13}$ and $R_{14}$.

The NOR circuit 60 of the FIG. 11 synchronous rectifier control circuit $7_c$ functions just like the logic network 20 of the FIG. 1 circuit 7. It is therefore apparent that this embodiment offers the same advantages as does that of FIG. 1.

Figure 13:
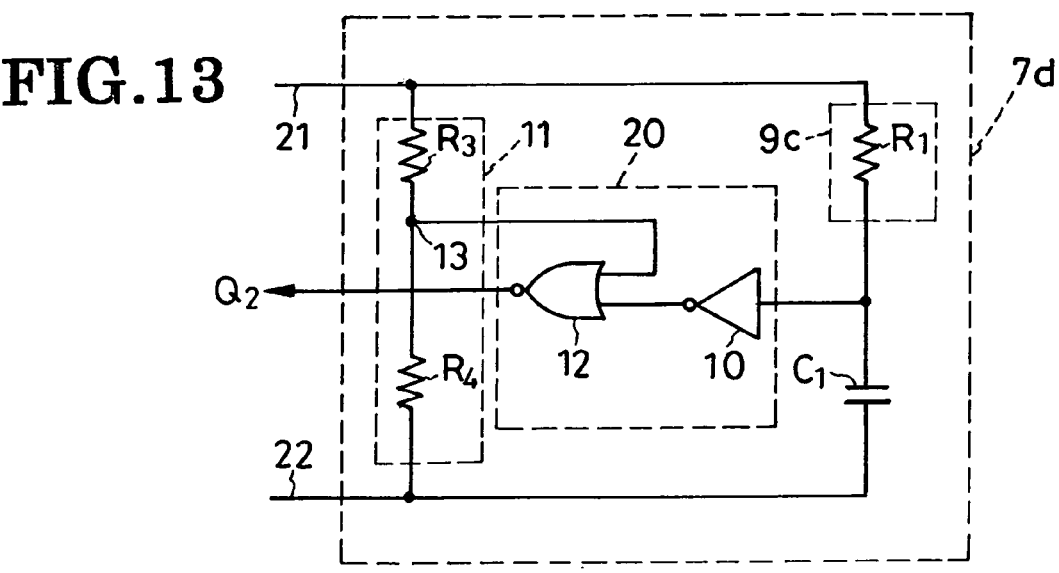
FIG. 13 is a schematic electrical diagram of a modification of the synchronous rectifier control circuit in the FIG. 1 embodiment.

Embodiment of FIG. 13

A further modified synchronous rectifier control circuit $7_d$ shown in FIG. 13 finds use in the FIG. 1 power supply in substitution for the circuit 7. The modified synchronous rectifier control circuit $7_d$ features another modification $9_c$ of the charge/discharge circuit 9 of the FIG. 1 embodiment. The modified charge/discharge circuit $9_c$ has the resistor $R_1$ but neither discharge resistor $R_2$ nor rectifier diode $D_1$ of the FIG. 1 circuit 9. Connected between conductor 21 and capacitor $C_1$, the resistor $R_1$ lends itself to use for both charging and discharging of the capacitor $C_1$.

Figure 14:
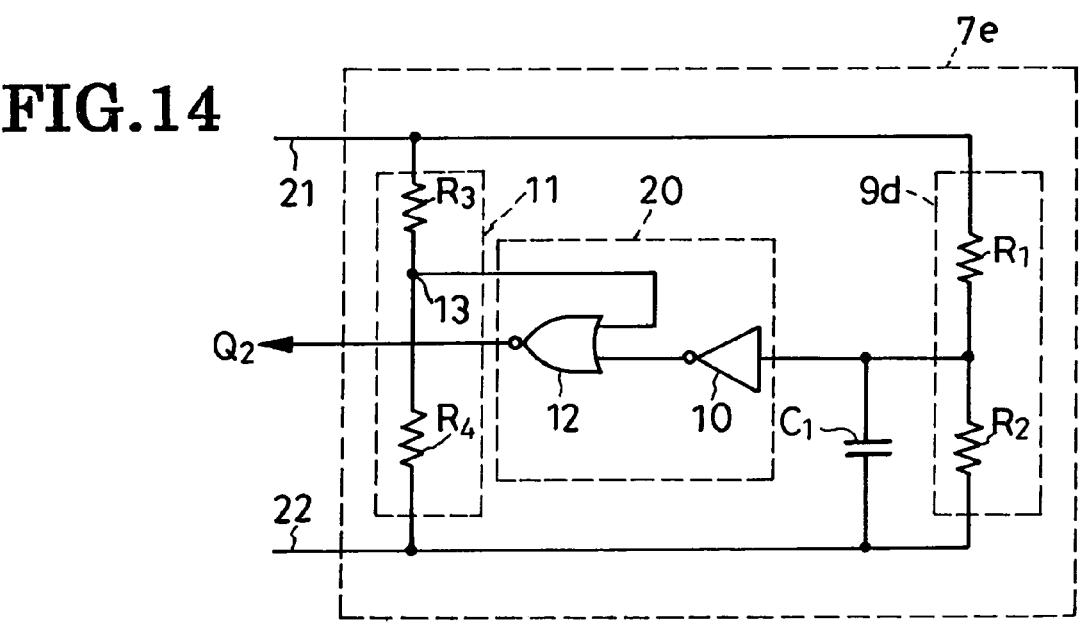
FIG. 14 is a schematic electrical diagram of another modification of the synchronous rectifier control circuit in the FIG. 1 embodiment.

Embodiment of FIG. 14

FIG. 14 shows a further modification $7_e$ of the synchronous rectifier control circuit 7 of FIG. 1. The modified synchronous rectifier control circuit $7_e$ features a further modified charge/discharge circuit $9_d$ but is otherwise identical with its FIG. 1 counterpart 7. The modified charge/discharge circuit $9_d$ is similar in construction to its FIG. 1 counterpart 9 except for the absence of the diode $D_1$. The resistor $R_1$, like that of FIG. 13, is utilized for both charging and discharging the capacitor $C_1$.

Figure 15:
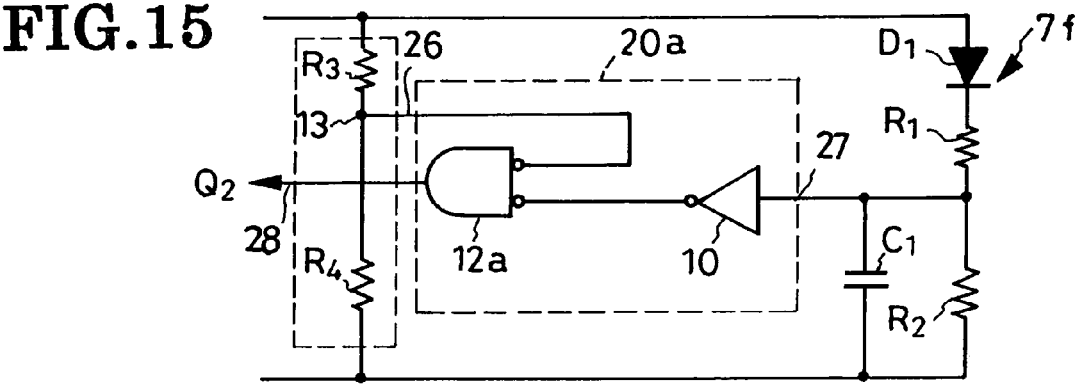
FIG. 15 is a schematic electrical diagram of a further modification of the synchronous rectifier control circuit in the FIG. 1 embodiment.

Embodiment of FIG. 15

A further modified synchronous rectifier control circuit $7_f$ given in FIG. 15 incorporates a modified logic network $20_a$, the other details of construction being as above explained with reference to FIG. 1. The modified logic network $20_a$ features an inverting AND gate $12_a$ in place of the NOR circuit or OR-inverter combination 12 of FIG. 1. The inverting AND gate $12_a$ is functionally equivalent to the NOR circuit 12.

Figure 16:
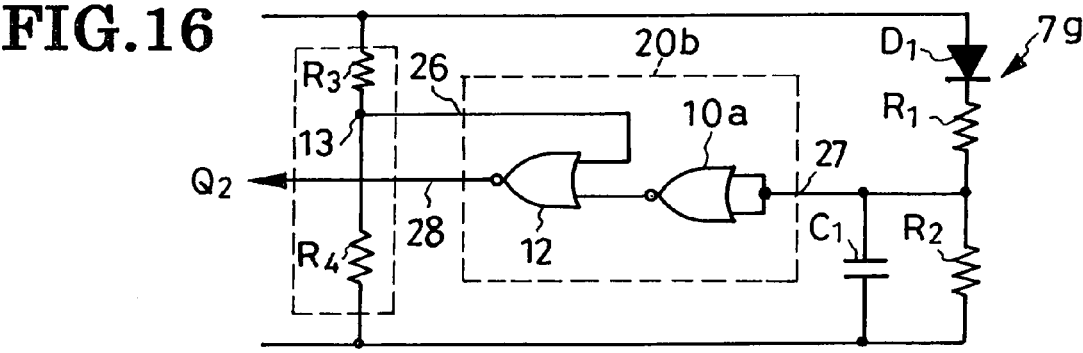
FIG. 16 is a schematic electrical diagram of a further modification of the synchronous rectifier control circuit in the FIG. 1 embodiment.

Embodiment of FIG. 16

In FIG. 16 is shown a further modified synchronous rectifier control circuit $7_g$ which is of the same construction as its FIG. 1 counterpart 7 except for another modified logic network $20_b$. The logic network $20_b$ differs from that of FIG. 1 in having a two-input NOR circuit $10_a$ in substitution for the NOT circuit 10. The NOR circuit $10_a$ has its two inputs both connected to the capacitor $C_1$ and its output connected to the NOR circuit 12. Having its two inputs short-circuited, the NOR circuit $10_a$ is functionally equivalent to the NOT circuit 10.

Figure 17:
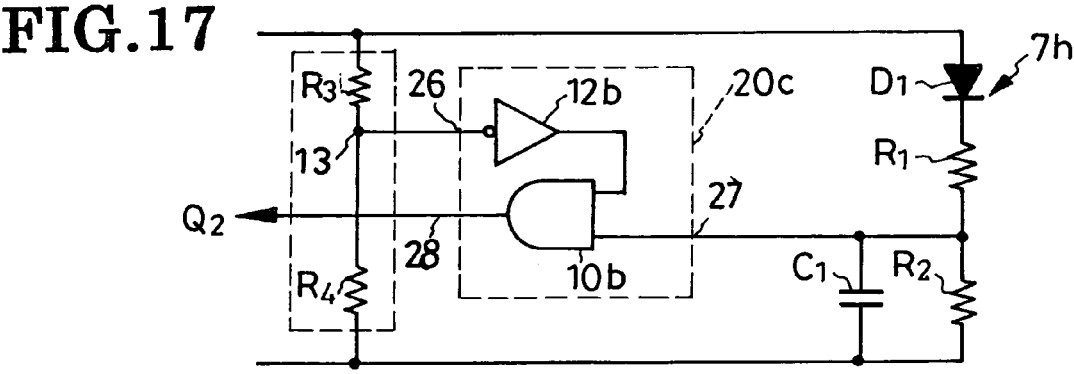
FIG. 17 is a schematic electrical diagram of a further modification of the synchronous rectifier control circuit in the FIG. 1 embodiment.

Embodiment of FIG. 17

Still another modified logic network $20_c$ is included in the synchronous rectifier control circuit $7_h$ of FIG. 17, which is otherwise of the same construction as that of FIG. 1. The logic network $20_c$ is a combination of an AND circuit $10_b$ and NOT circuit $12_b$. The AND circuit $10_b$ has one input connected via the NOT circuit $12_b$ to the junction 13 between the voltage-dividing resistors $R_3$ and $R_4$. As has been stated in connection with FIG. 1, the potential at the junction 13 represents a predefined fraction of the voltage between the drain and source of the synchronous rectifier $Q_2$. The other input of the AND circuit $10_b$ is connected to the capacitor $C_1$.

It is understood that the AND circuit $10_b$ is equipped to compare the incoming voltage across the capacitor $C_1$ with a predetermined threshold. Only when the capacitor voltage is higher than the threshold, and at the same time when the output from the NOT circuit $12_b$ is high, does the AND gate $10_b$ go high thereby causing conduction through the switch 8, FIG. 1, of the synchronous rectifier $Q_2$. The logic network $20_c$ is therefore functionally equivalent to its FIG. 1 counterpart 20.

Figure 18:
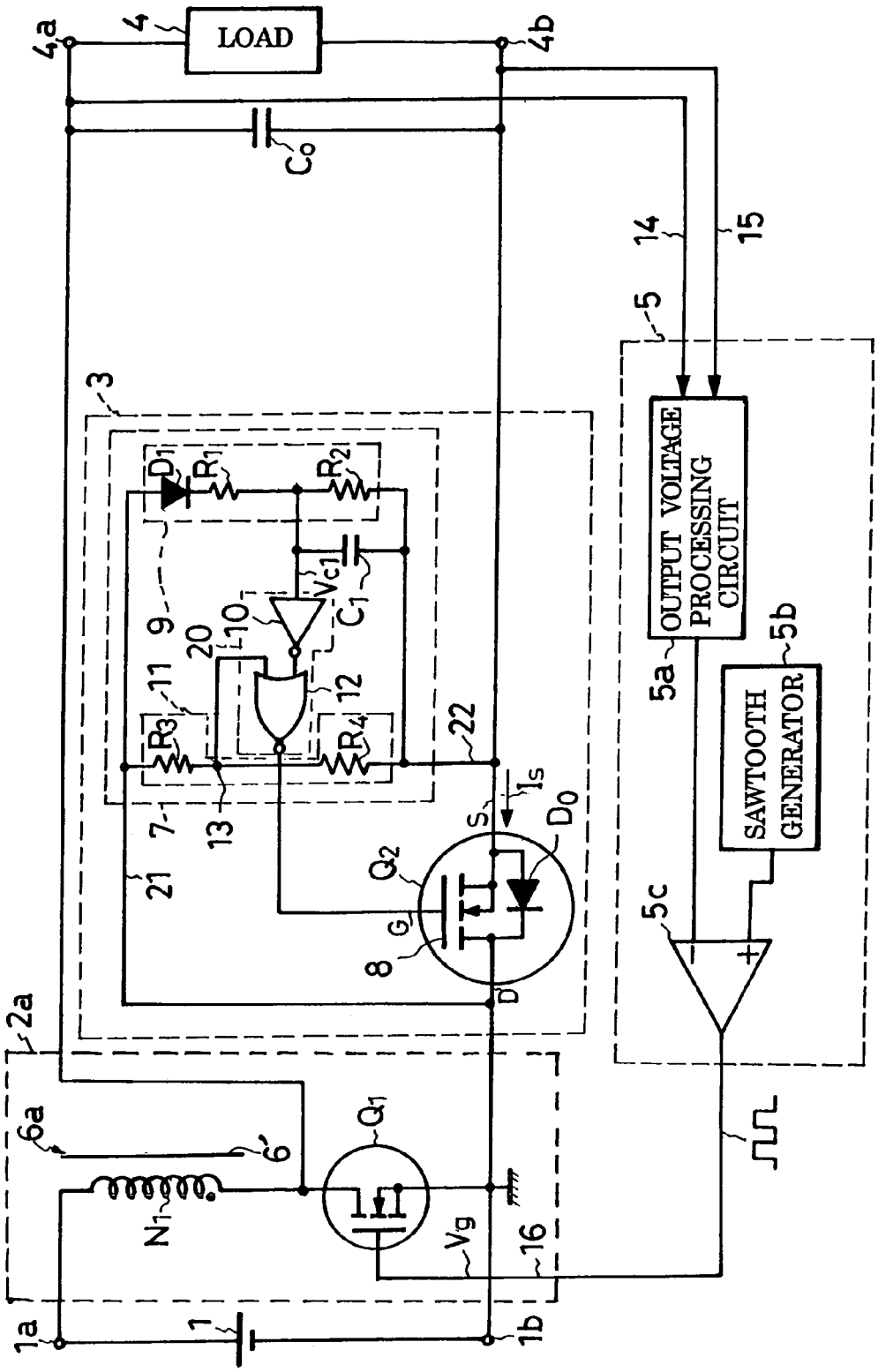
FIG. 18 is a schematic electrical diagram of a further preferred form of switching-mode power supply embodying the invention.

Embodiment of FIG. 18

FIG. 18 represents an application of the instant invention to the boost-converter variety of switching-mode power supply. This embodiment differs from that of FIG. 1 only in the design of its boost converter circuit $2_a$ and its connections to the other parts of the apparatus.

The boost converter circuit $2_a$ includes an inductor $6_a$ which is akin in construction to the transformer 6, FIG. 1, minus the secondary winding $N_2$. Coiled around the magnetic core 6', the winding $N_1$ of the inductor $6_a$ is connected in series with the active switch $Q_1$. The inductor $6_a$ stores energy as does the transformer 6. It is understood that the inductor $6_a$ has another winding, not shown, which is electromagnetically coupled to the winding $N_1$ for powering the various circuit elements. The DC output terminal $4_a$ is connected to the junction between inductor winding $N_1$ and active switch $Q_1$, and the other DC output terminal $4_b$ to the DC input terminal $1_b$ via the synchronous rectifier $Q_2$.

Energy is stored on the inductor $6_a$ during the conducting periods of the active switch $Q_1$. During its nonconducting periods the sum of the voltages across the DC source 1 and across the inductor winding $N_1$ causes the smoothing capacitor $C_o$ to be charged to a voltage higher than the DC input voltage. The synchronous rectifier $Q_2$ turns on and off in the same time relationship to the active switch $Q_1$ as in the FIG. 1 embodiment.

Figure 19:
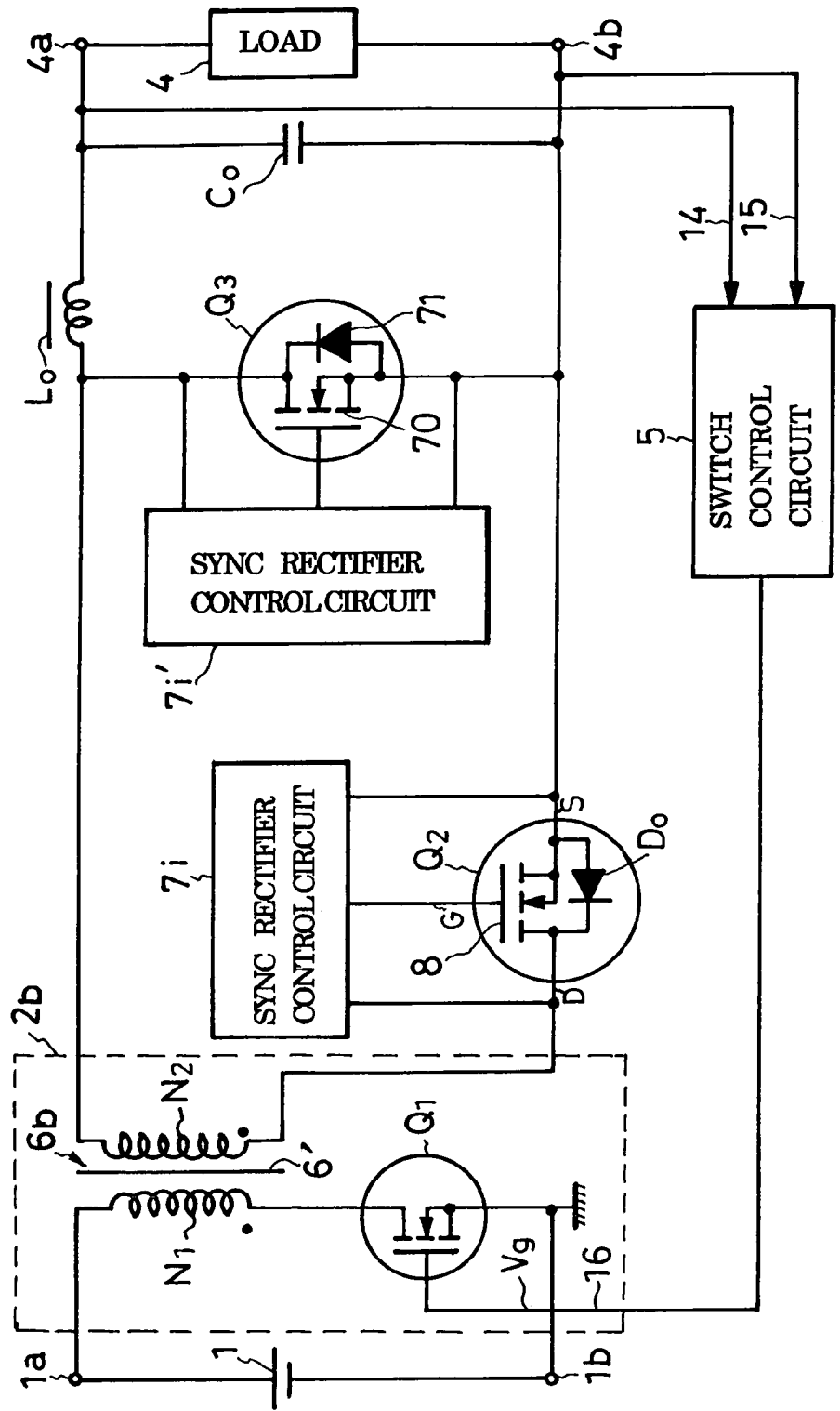
FIG. 19 is a schematic electrical diagram of a further preferred form of switching-mode power supply embodying the invention.

Embodiment of FIG. 19

The invention is applicable to a forward-converter type of switching-mode power supply as well, as in FIG. 19. The forward converter circuit $2_b$ of this embodiment differs from its FIG. 1 counterpart 2 only in having a transformer $6_b$ whose primary $N_1$ and secondary $N_2$ are oriented in the same direction. As a consequence, the synchronous rectifier $Q_2$ conducts during the conducting periods of the active switch $Q_1$. The synchronous rectifier control circuit $7_i$ of this embodiment is drawn in block form because it is of the same construction as its FIG. 1 counterpart 7 except that, as in the FIG. 11 embodiment, the equivalent of the capacitor $C_1$ is charged during the nonconducting periods of the active switch $Q_1$ and discharges during its conducting periods.

This embodiment incorporates a smoothing circuit comprising an inductor $L_o$ and a second synchronous rectifier $Q_3$, in addition to the smoothing capacitor $C_o$. The inductor $L_o$ is connected between transformer secondary $N_2$ and smoothing capacitor $C_o$. The second synchronous rectifier $Q_3$ is connected in parallel with the serial circuit of the inductor $L_o$ and smoothing capacitor $C_o$. The energy that has been stored on the inductor $L_0$ during the conducting periods of the active switch $Q_1$ is released by way of the path comprising the inductor $L_o$, smoothing capacitor $C_o$, and second synchronous rectifier $Q_3$.

Fabricated in the form of a field-effect transistor, the second synchronous rectifier $Q_3$ comprises a parallel connection of switch 70 and diode 71. The diode 71 may be either an integral part of the switch 70 or a discrete part.

A control circuit $7_i'$ for the second synchronous rectifier $Q_3$ is also shown in block form because it is of the same construction as the synchronous rectifier control circuit 7 of FIG. 1. The second synchronous rectifier control circuit $7_i'$ operates to cause conduction through the second synchronous rectifier control switch 70 when the second synchronous rectifier $Q_3$ must be conducting. Power loss at the second synchronous rectifier $Q_3$ is thus lessened.

The two synchronous rectifier control circuit $7_i$ and $7_i'$ used in this embodiment are each constructed like the FIG. 1 circuit 7, so that this embodiment obtains the same advantages as those of the FIG. 1 embodiment.

Figure 20:
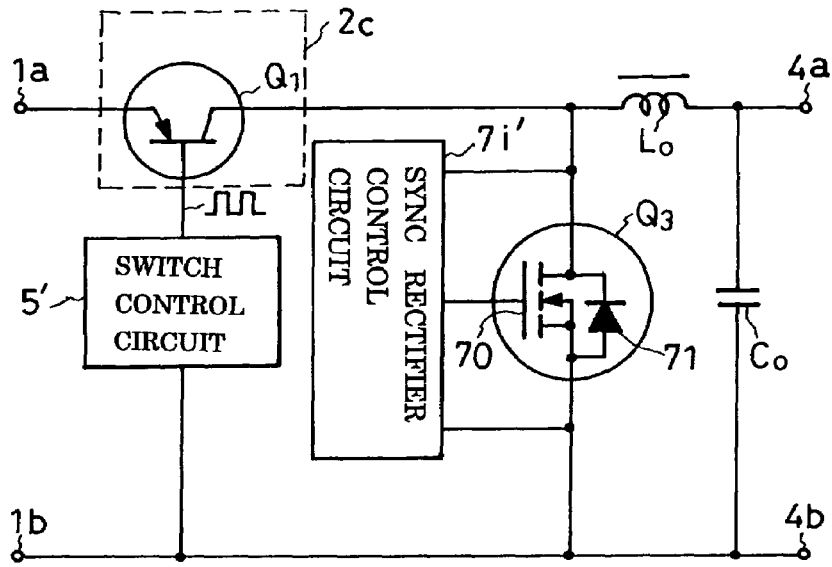
FIG. 20 is a schematic electrical diagram of a further preferred form of switching-mode power supply embodying the invention.

Embodiment of FIG. 20

In FIG. 22 is shown the invention as applied to a chopper-type switching-mode power supply having a converter circuit $2_c$ which contains an active switch $Q_1$ in the form of a pnp transistor. The active switch $Q_1$ has an emitter connected to one DC input terminal $1_a$, a collector connected to one DC output terminal $4_a$ via the inductor $L_o$, and a base connected to the other DC input terminal $1_b$ via a switch control circuit 5' of prior art design by which the switch is turned on and off.

Connected between the active switch 1 and the pair of DC output terminals $4_a$ and $4_b$ is a smoothing circuit of the same construction as in FIG. 19, comprising the smoothing capacitor $C_o$, the inductor $L_o$ and the synchronous rectifier $Q_3$. The synchronous rectifier $Q_3$ and its control circuit $7_i'$ are similar in function to those designated by the same reference characters in FIG. 19 and in construction to the synchronous rectifier $Q_2$, FIG. 1, and its control circuit 7.

Figure 21:
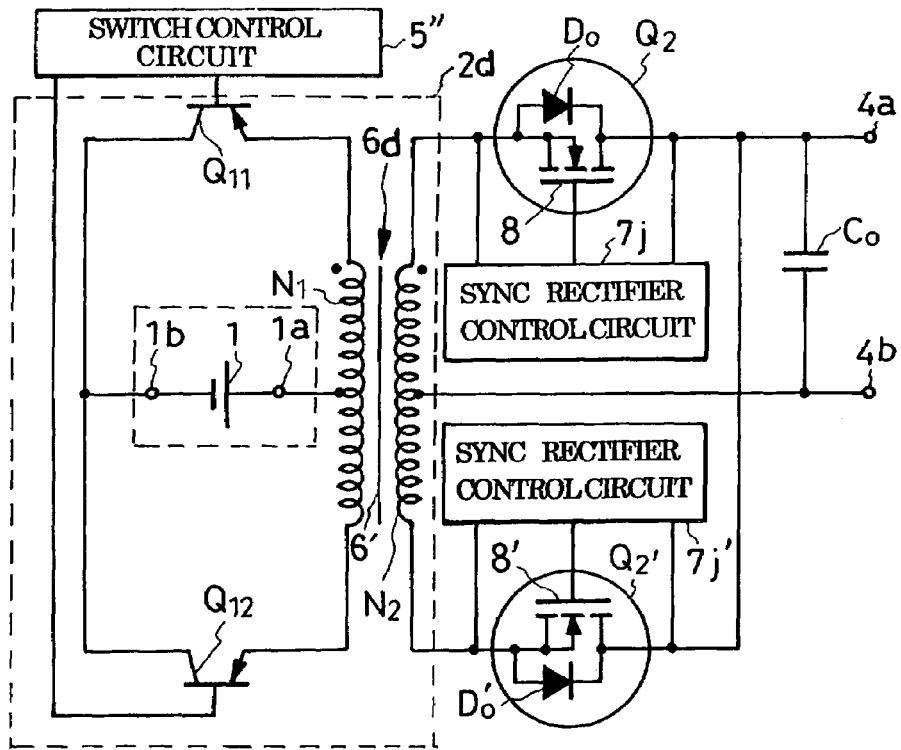
FIG. 21 is a schematic electrical diagram of a further preferred form of switching-mode power supply embodying the invention.

Embodiment of FIG. 21

The switching-mode power supply shown here is broadly divisible into an inverting push-pull converter circuit $2_d$ and a rectifying and smoothing circuit. Itself well known in the art, the inverting push-pull converter circuit $2_d$ comprises a pair of active switches $Q_{11}$ and $Q_{12}$ and a transformer $6_d$. The active switches $Q_{11}$ and $Q_{12}$, each in the form of a transistor, are to be alternately turned on and off by a switch control circuit 5" which has outputs connected to their bases.

The transformer $6_d$ has both of its primary winding $N_1$ and secondary winding $N_2$ center-tapped. The transformer primary $N_1$ has its tap connected to one DC input terminal $1_a$, its one extremity connected to the other DC input terminal $1_b$ via the active switch $Q_{11}$, and its other extremity connected to this other DC input terminal $1_b$ via the other active switch $Q_{12}$. The transformer secondary $N_2$ is connected to the pair of DC output terminals $4_a$ and $4_b$ via a full-wave rectifier circuit and the smoothing capacitor $C_o$.

The full-wave rectifier circuit comprises a first synchronous rectifier $Q_2$ connected between one extremity of the transformer secondary $N_2$ and one DC output terminal $4_a$, and a second synchronous rectifier $Q_2'$ connected between the other extremity of the transformer secondary $N_2$ and that one DC output terminal $4_a$. The center tap of the transformer secondary $N_2$ is connected to the other DC output terminal $4_b$. The two synchronous rectifiers $Q_2$ and $Q_2'$ are both of the same construction as its FIG. 1 counterpart $Q_2$.

For on/off control of the synchronous rectifiers $Q_2$ and $Q_2'$ there are provided two synchronous rectifier control circuits $7_j$ and $7_j'$ for the respective rectifiers. The synchronous rectifier control circuits $7_j$ and $7_j'$ are each analogous in construction with the FIG. 1 circuit 7 except that the circuits $7_j$ and $7_j'$ are so made that the first synchronous rectifier $Q_2$ conducts during the conducting period of the first active switch $Q_{11}$, and that the second synchronous rectifier $Q_2'$ conducts during the conducting periods of the second active switch $Q_{12}$. The other constructional and operational details of this embodiment, as well as the advantages accruing therefrom, are as previously explained with reference to FIGS. 1 and 2.

POSSIBLE MODIFICATIONS

Although the switching-mode power supply according to the present invention has been shown and described hereinbefore in terms of some currently preferred forms, it is not desired that the invention be limited by the exact details of these preferred forms or by the description thereof. The following is a brief list of possible modifications of the illustrated embodiments which are all believed to fall within the purview of the instant invention:

1. The converter circuits 2 and $2_a$–$2_d$ of the FIGS. 1 and 18–21 embodiments are replaceable as by half-bridge inverters or polarity-inverting DC-to-DC converters.

2. The synchronous rectifier control circuits of the FIGS. 3–5, 7, 9–11 and 13–17 embodiments are adoptable in places of the synchronous rectifier control circuits $7_i$, $7_i'$, $7_j$ and $7_j'$ of the FIGS. 18–21 embodiments.

3. The synchronous rectifier control circuits $7_d$–$7_h$ of the FIGS. 13–17 embodiments are adoptable, either with or without minor modifications, in places of their counterparts in the FIGS. 4, 5, 7 and 9–11 embodiments.

4. The FIGS. 3–5 and 7 embodiments are adaptable for a boost converter type like the FIG. 11 embodiment.

5. The synchronous rectifier $Q_2$ could be serially connected between the transformer secondary $N_2$ or primary $N_1$ and the positive supply terminal $4_a$.

6. The active switch $Q_1$ of the FIGS. 1, 3–7, 11, 18 and 19 could be semiconductor switches other than IGFETs, examples being transistors and insulated-gate bipolar transistors (IGBTs).

7. The active switches $Q_1$, $Q_{11}$ and $Q_{12}$ of the FIGS. 20 and 21 embodiments could also be of other types such as FETs and IGBTs.

8. The synchronous rectifiers $Q_2$ and $Q_2'$ could be of combinations of other types of semiconductor switches such as a transistor or IGBT, and a diode.

What is claimed is:

1. A switching-mode power supply for DC-to-DC conversion, comprising:
   (a) DC input means for inputting a DC voltage;
   (b) DC output means for outputting a DC voltage;
   (c) a converter circuit connected between the DC input means and the DC output means, the converter circuit including an active switch for switching the input DC voltage on and off;
   (d) a switch control circuit connected to the active switch of the converter circuit for on/off control thereof;
   (e) a synchronous rectifier switch connected between the converter circuit and the DC output means;
   (f) a diode connected in parallel with the synchronous rectifier switch;
   (g) conduction period detect means for providing a conduction period detect signal indicative of periods of time during which the active switch is held conductive by the switch control circuit;
   (h) a capacitor for determination of conducting periods of the synchronous rectifier switch;
   (i) a charge/discharge circuit connected to the converter circuit and the capacitor for causing the latter to be charged and discharged according to whether the active switch is conductive or nonconductive; and
   (j) a logic network having an input connected to the conduction period detect means, another input connected to the capacitor, and an output connected to the synchronous rectifier switch, for making on/off control of the synchronous rectifier switch according to whether the active switch is conducting or nonconducting and whether the voltage across the capacitor is higher than a predefined voltage or not.

2. A switching-mode power supply as defined in claim 1, wherein the conduction period detect means is adapted to provide a binary conduction period detect signal indicative of whether the active switch is conductive or nonconductive.

3. A switching-mode power supply as defined in claim 1, wherein the conduction period detect means comprises means for detecting a voltage indicative of whether the active switch is conductive or nonconductive.

4. A switching-mode power supply as defined in claim 1, wherein the charge-discharge circuit is adapted to cause the capacitor to be charged during the conducting periods of the active switch and to discharge during the nonconducting periods of the active switch.

5. A switching-mode power supply as defined in claim 1, wherein the charge-discharge circuit comprises a resistor connected between one terminal of the synchronous rectifier switch and one terminal of the capacitor, the capacitor having another terminal connected to another terminal of the synchronous rectifier switch.

6. A switching-mode power supply as defined in claim 5, wherein the charge-discharge circuit comprises a second resistor connected in parallel with the capacitor.

7. A switching-mode power supply as defined in claim 6, wherein the charge-discharge circuit comprises a diode connected in series with the first recited resistor.

8. A switching-mode power supply as defined in claim 1 wherein the charge-discharge circuit comprises:
   (a) charge circuit means comprising a first diode and a first resistor which are serially interconnected between one terminal of the synchronous rectifier switch and one terminal of the capacitor, the capacitor having another terminal connected to another terminal of the synchronous rectifier switch; and
   (b) discharge circuit means comprising a second diode and a second resistor which are serially interconnected between said one terminal of the capacitor and said one terminal of the synchronous rectifier switch.

9. A switching-mode power supply as defined in claim 1, wherein the DC input means comprises a pair of DC input terminals, wherein the converter circuit comprises an inductor, wherein the active switch has a first main electrode connected to one of the DC input terminals via the inductor, a second main electrode connected to the another of the DC input terminals and a control electrode connected to the switch control circuit, wherein the conduction period detect means comprises a conduction period detect conductor connected to the switch control circuit for detecting a switch control signal being thereby applied to the active switch for on/off control thereof, wherein the charge/discharge circuit comprises a charge circuit having a rectifying diode and a resistor which are interconnected in series between the conduction period detect conductor and one terminal of the capacitor, wherein the charge/discharge circuit further comprises a discharge circuit connected in parallel with the capacitor, and wherein the capacitor has another terminal connected to the second main electrode of the active switch.

10. A switching-mode power supply as defined in claim 1, wherein the DC input means comprises a pair of DC input terminals, wherein the converter circuit comprises an inductor, wherein the active switch has a first main electrode connected to one of the DC input terminals via the inductor, a second main electrode connected to the another of the DC input terminals and a control electrode connected to the switch control circuit, wherein the conduction period detect means comprises a conduction period detect conductor connected to the switch control circuit for detecting a switch control signal being thereby applied to the active switch for on/off control thereof, wherein the charge/discharge circuit comprises a charge circuit having a first rectifying diode and a resistor which are interconnected in series between the first main electrode of the active switch and the capacitor, and wherein the charge/discharge circuit further comprises a discharge circuit having a second rectifying diode and a resistor which are interconnected in series between the capacitor and the first main electrode of the active switch.

11. A switching-mode power supply as defined in claim 1, further comprising isolation means connected between the logic network and the synchronous rectifier switch.

12. A switching-mode power supply as defined in claim 1, wherein the logic network comprises:

(a) first logic circuit means having an input connected to the capacitor for providing a binary capacitor voltage signal indicative of results of comparison of the voltage across the same with the predefined voltage; and
   (b) second logic circuit means having an input connected to the conduction period detect means for inputting the conduction period detect signal, another input connected to the first logic circuit means for inputting the capacitor voltage signal, and an output connected to the synchronous rectifier switch, for causing conduction through the synchronous rectifier switch when the capacitor voltage is higher than the predefined voltage and at the same time when the active switch is non-conducting.

13. A switching-mode power supply as defined in claim 12, wherein the first logic circuit means comprises a NOT circuit having a threshold value.

14. A switching-mode power supply as defined in claim 12, wherein the first logic circuit means comprises a NOR circuit having two inputs both connected to the capacitor.

15. A switching-mode power supply as defined in claim 12, wherein the first logic circuit means of the logic network comprises a comparator having a first input connected to the capacitor and a second input connected to a reference voltage source.

16. A switching-mode power supply as defined in claim 12, wherein the second logic circuit means of the logic network comprises a NOR or inverting AND circuit.

17. A switching-mode power supply as defined in claim 1, wherein the logic network comprises:
   (a) a NOT circuit having an input connected to the conduction period detect means; and
   (b) an AND circuit having an input connected to the capacitor, another input connected to the NOT circuit, and an output connected to the synchronous rectifier switch, the AND circuit having a threshold value with which to compare the voltage across the capacitor.

18. A switching-mode power supply as defined in claim 1, further comprising a conduction period limiter circuit for limiting the conducting periods of the synchronous rectifier switch, the conduction limiter circuit comprising:
   (a) a second capacitor;
   (b) a second charge/discharge circuit connected to the second capacitor for causing the same to be charged during the conducting periods of the active switch and to discharge during the nonconducting periods thereof;
   (c) a wave-shaping circuit connected to the second capacitor for providing an output indicative of whether a voltage across the second capacitor is higher than a second predefined voltage or not, the second predefined voltage being such that the output from the wave-shaping circuit indicates whether the conducting periods of the active switch is less than a prescribed limit or not; and
   (d) compulsory discharge path means connected between the wave-shaping circuit and the first recited capacitor for providing a compulsory discharge path for the first capacitor.

19. A switching-mode power supply as defined in claim 18, wherein the compulsory discharge path means of the conduction limiter circuit comprises a second diode so oriented as to conduct when the active switch remains conductive longer than the prescribed limit.

20. A switching-mode power supply as defined in claim 19, wherein the compulsory discharge path means of the conduction limiter circuit further comprises a voltage-regulating diode connected in series with, and oriented opposite to, the second diode.

21. A switching-mode power supply as defined in claim 1, wherein the diode is built into the synchronous rectifier switch.

* * * * *